(12) United States Patent
Rivard

(10) Patent No.: US 6,571,738 B2
(45) Date of Patent: Jun. 3, 2003

(54) ANIMAL CAGING AND BIOLOGICAL STORAGE SYSTEMS

(75) Inventor: Germain F. Rivard, Denver, CO (US)

(73) Assignee: Animal Care Systems, Inc., Littleton, CO (US)

( * ) Notice: Subject to any disclaimer, the term of this patent is extended or adjusted under 35 U.S.C. 154(b) by 14 days.

(21) Appl. No.: 09/861,317

(22) Filed: May 17, 2001

(65) Prior Publication Data

US 2002/0043217 A1 Apr. 18, 2002

Related U.S. Application Data

(63) Continuation of application No. 09/232,429, filed on Jan. 15, 1999, now Pat. No. 6,257,171.
(60) Provisional application No. 60/071,631, filed on Jan. 16, 1998.

(51) Int. Cl.[7] .................................................. A01K 1/03
(52) U.S. Cl. ........................................................ 119/419
(58) Field of Search ................................ 119/417, 418, 119/419, 455, 456

(56) References Cited

U.S. PATENT DOCUMENTS

| | | | | |
|---|---|---|---|---|
| 3,557,756 A | 1/1971 | Ramsey | ......................... | 119/15 |
| 3,630,174 A | 12/1971 | Runkle et al. | ................. | 119/15 |
| 3,662,713 A | 5/1972 | Sachs | .......................... | 119/18 |
| 3,749,061 A | 7/1973 | Connelly | ..................... | 119/19 |
| 3,830,200 A | 8/1974 | Patterson | ..................... | 119/15 |
| 3,830,201 A | 8/1974 | Coulbourn | .................... | 119/17 |
| 3,877,420 A | 4/1975 | Eagleson, Jr. | ................. | 119/15 |
| 3,924,571 A | 12/1975 | Holman | ........................ | 119/15 |
| 3,990,399 A | 11/1976 | Davis, Jr. | ..................... | 119/17 |
| 4,343,261 A | 8/1982 | Thomas | ........................ | 119/15 |
| 4,402,280 A | 9/1983 | Thomas | ........................ | 119/15 |

(List continued on next page.)

OTHER PUBLICATIONS

"Experimental Work and Verification of CFD Methodology"; *Ventilation Design Handbook on Animal Research Facilities Using Static Microisolators*; 1(IV); Sep. 1998; pp. IV–1–IV–68.

Novak, "Individually Ventilated Microisolation Cages"; *Lab Animal*, Sep. 1997, pp. 54–57.

Baer et al., "Effects Of The Use Of Filtered Microisolator Tops On Cage Microenvironment And Growth Rate Of Mice"; *Laboratory Animal Science*; 47(3); Jun. 1997; pp. 327–329.

Notes from: Applied Research Ethics National Association (ARENA) Meeting and Public Responsilbility in Medicine & Research (PRIM&R) Meeting; *Temple University*; Mar. 1997; pp. 8–9.

Mukerjee; "Trends In Animal Reseaerch: Increased Concern For Animals, Among Scientists As Well As The Public, Is Changing The Ways In Which Animals Are Used For Research And Safety Testing"; *Scientific American*; Feb. 1997, pp. 86–93.

(List continued on next page.)

*Primary Examiner*—Thomas Price
(74) *Attorney, Agent, or Firm*—Sheridan Ross P.C.

(57) ABSTRACT

A novel microisolation container for laboratory animals or other species includes a rectangular, transparent base containing an intake port at the lower front end and a detachable top sealingly attached to the base which contains an exhaust port in the end opposite the intake port. The intake and exhaust ports are preferably covered with a filter membrane which excludes airborne contaminants. The interior of the top is contoured to provide a domed sloping ceiling for the container, the lower portion being adjacent the intake or front end of the container and the upper portion being adjacent the exhaust or rear end. Preferred embodiments include a feeder assembly which is supported by perforated supports which serve as shelter for the animals. The front and rear ports, the contoured ceiling and the feeder design aid in the laminar flow of air through the cage. A perforated floor, absorbent insert and disposable waste bag can be included in the base of the cage.

20 Claims, 18 Drawing Sheets

U.S. PATENT DOCUMENTS

| | | | | |
|---|---|---|---|---|
| 4,435,194 | A | 3/1984 | Picard et al. | 55/96 |
| 4,540,625 | A | 9/1985 | Sherwood | 428/283 |
| 4,640,228 | A | 2/1987 | Sedlacek et al. | 119/15 |
| 4,907,536 | A | 3/1990 | Chrisler | 119/15 |
| 4,940,017 | A | 7/1990 | Niki et al. | 119/18 |
| 5,038,721 | A | 8/1991 | Ouellette et al. | 119/167 |
| 5,044,316 | A | 9/1991 | Thomas | 119/15 |
| 5,143,752 | A | 9/1992 | Nakajima et al. | 427/244 |
| 5,148,771 | A | 9/1992 | Schuett et al. | 119/17 |
| 5,190,879 | A | 3/1993 | Wolfe et al. | 435/287 |
| 5,288,463 | A | 2/1994 | Chemelli | 422/58 |
| 5,400,744 | A | 3/1995 | Coiro, Sr. et al. | 119/72.5 |
| 5,474,024 | A | 12/1995 | Hallock | 119/17 |
| 5,482,005 | A | 1/1996 | Thom | 119/17 |
| 5,513,596 | A | 5/1996 | Coiro, Sr. et al. | 119/457 |
| 5,592,936 | A | 1/1997 | Thomas, Jr. et al. | 128/206.12 |
| 5,688,297 | A | 11/1997 | Spengler | 55/356 |
| 5,865,144 | A | 2/1999 | Semenuk | 119/456 |
| 5,924,384 | A | 7/1999 | Dietrich et al. | 119/419 |
| 5,954,013 | A | 9/1999 | Gabriel et al. | 119/419 |
| 6,041,741 | A | 3/2000 | Gabriel et al. | 119/417 |
| 6,257,171 | B1 * | 7/2001 | Rivard | 119/419 |

OTHER PUBLICATIONS

Reeb et al., "Impact Of Room Ventilation Rates On Mouse Cage Ventilation And Microenvironment"; *Contemporary Topics*; 36(1); Jan. 1997, pp. 74–79.

Tu et al.; "Determination Of Air Distribution, Exchange Velocity, And Leakage In Three Individually Ventilated Rodent Caging Systems"; *Contemporary Topics*; 36(1); Jan. 1997; pp. 69–72.

Crawford; "A Review Of The Animal Welfare Enforcement Report Data 1973 Through 1995", *Animal Welfare Information Center Newsletter*, 7(2): Summer 1996; pp. 1–2.

Perkins et al.; "Characterization And Quantification Of Microenvironmental Contaminatants In Isolator Cages With a Variety Of Contact Beddings"; *Contemporary Topics*; 34(3); May 1995; pp. 93–98.

Choi et al.; "Effect Of Population Size On Humidity And Ammonia Levels In Individually Ventilated Microisolation Rodent Caging"; *Contemporary Topics*; 33(6), Nov. 1994; pp. 77–81.

Huerkamp et al.; "Effect Of Intracage Ventilation And Automatic Watering On Outbred Mouse Reproductive Performance And Weanling Growth"; *Contemporary Topics*; 33(5); Sep. 1994; pp. 58–61.

Huerkamp et al.; "Comparative Effects Of Forced–Air, Individual Cage Ventilation Or An Absorbent Bedding Additive On Mouse Isolator Cage Microenvironment"; *Contemporary Topics*; 33(2) Mar. 1994; pp. 58–61.

Olfert; "Allergies To Laboratory Animals: Aspects Of Monitoring And Control"; *Lab Animal*; Feb. 1993, pp. 32–35.

Lipman; "Microenvironmental Conditions In Isolator Cages: An Important Research Variable"; *Lab Animal*; Jun. 1992; pp. 23–27.

"Residential Air Cleaning Devices: A Summary Of Available Information"; *Environmental Protection Agency Indoor Environments Division*; 6604J(EPA 400/1–90–002); Feb. 1990; 11 pgs.

Cooper; "Design Considerations For Research Animal Facilities"; *Lab Animal*; Sep. 1989; pp. 23–26.

Keller et al.; "An Evaluation Of Intra–Cage Ventilation In Three Animal Caging Systems"; *Laboratory Animal Science*; 39(3); May 1989; pp. 237–242.

* cited by examiner

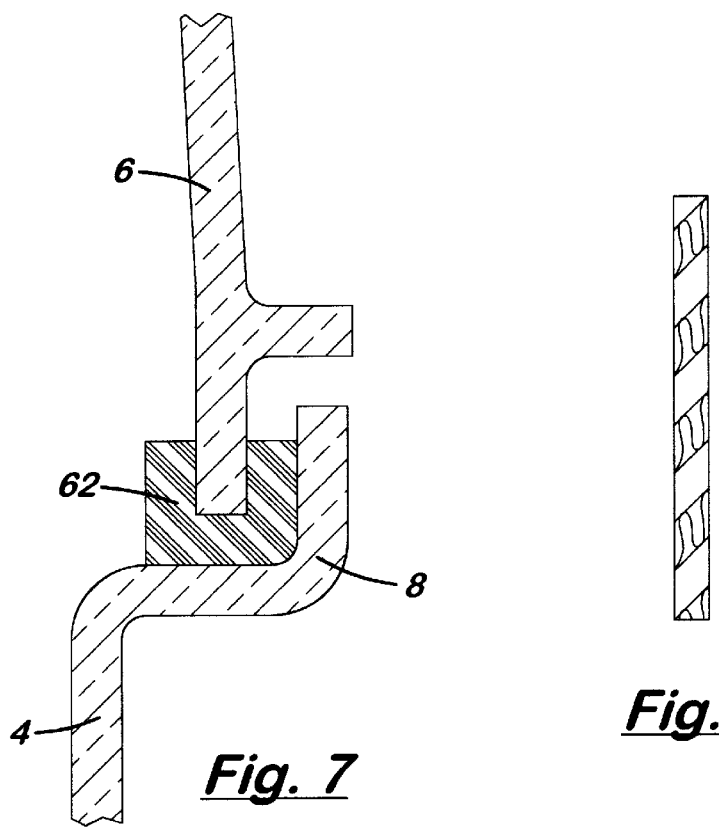
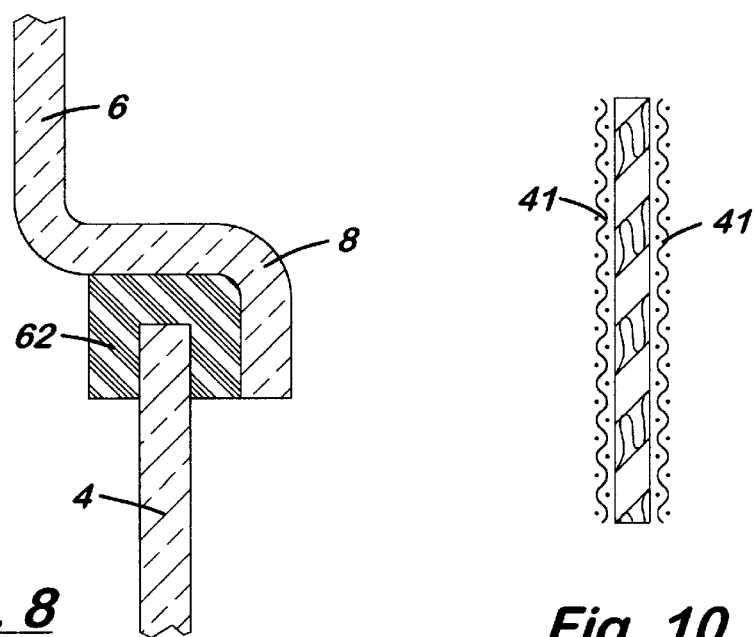
Fig. 7
Fig. 9
Fig. 8
Fig. 10

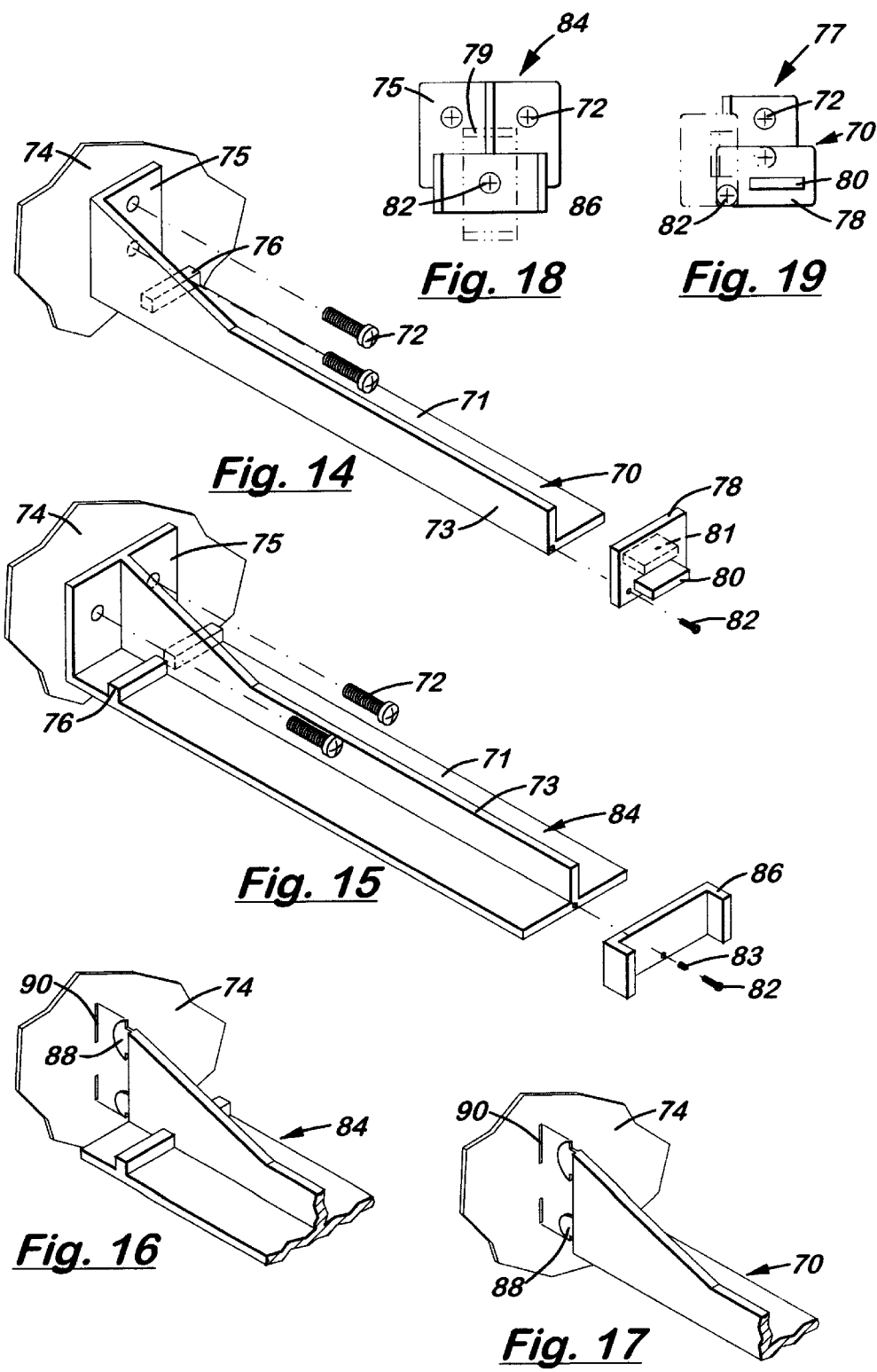

ANIMAL CAGING AND BIOLOGICAL STORAGE SYSTEMS

REFERENCE TO RELATED APPLICATIONS

This application is a continuation of U.S. patent application Ser. No. 09/232,429 filed Jan. 15, 1999, now U.S. Pat. No. 6,257,171, which claims priority from U.S. Provisional Patent Application Ser. No. 60/071,631, filed Jan. 16, 1998. The disclosure of the aforemententioned applications are incorporated herein by reference in their entireties.

FIELD OF INVENTION

The present invention relates to closed-system caging or storage systems for animals, biological materials, plants or the like, incorporating intake and exhaust filter membrane ports as barriers to the movement of contaminants into or out of the isolation containers. Ventilation by convection flow (passive) or mechanical (active) exhaust systems provide quality contamination-free air to the occupants and handlers.

BACKGROUND OF THE INVENTION

As described in Wolfe's U.S. Pat. No. 5,190,879 (filed 1991), millions of laboratory animals have been used every year in experimental research. These animals range from mice to non-human primates. In order to conduct valid and reliable experiments, researchers must be assured that their animals are protected from pathogens and microbial contaminants that could affect test results and conclusions.

There are presently at least 1300 research facilities and 223 federal agencies registered with the U.S. Department of Agriculture (USDA) that use registered laboratory animals. (Crawford, "A review of the animal welfare enforcement report data, 1973–1995," AWIC Newsletter, Summer 1996) These facilities include institutions, organizations and corporations such as hospitals, colleges and universities, diagnostic and toxicology laboratories, pharmaceutical companies and biotechnology companies. In 1995, these combined organizations used a total of 1,395,463 registered animals, of which 333,379 were Guinea pigs and 248,402 were hamsters. In addition to these registered facilities, there are nearly a thousand Institutional Animal Care and use Committees (IACUC) that report to the Public Health Service (PHS), mostly the National Institutes of Health. Some 90 percent of the animals used at these institutions are mice and rats, but exact figures for mice and rats are not known, since they are not registered animals. Nevertheless, it is estimated that the United States uses between 15.3 and 18.7 million mice and rats a year. (See Mukerjee, "Trends in Animal Research," *Scientific American*, February 1997, pp. 86–93 and Stephens, "A Current View of Vivisection Animal Research in America," *The Animal's Agenda*, September/October 1996, pp. 20–25.) In Canada, 1.25 million mice and 650,000 rats were reported (by Mukergee, supra) to have been used in 1992 for research. These figures exclude permanent breeding populations at research institutions and commercial suppliers, which are estimated to number 1.5 million mice and 500,000 rats.

Many laboratory animals in the past have suffered subclinical infections, in which they did not demonstrate any overt signs of disease. Because more research is now being conducted at the molecular and microscopic level, these subclinical infections are being discovered and are invalidating research. Various studies have demonstrated that contamination and compromised animal integrity are pervasive problems in the United States. The loss of biological integrity results in significant losses in valuable research time and money in laboratory animal research.

Since the conditions of housing and husbandry affect animal and occupational health and safety as well as data variability, and influence an animal's well-being, the present invention relates to a biological barrier/isolator caging system for laboratory animals to permit optimum environmental conditions and animal comfort. Because of risks of contamination, biocontainment requirements, DNA hazardous issues, gene transfer technologies disease induction, allergen exposure in the workplace and animal welfare issues, current caging system technologies would appear insufficient to support the modern biotechnology industry. The objective of the invention is to attain performance standards such as the exclusion of pathogenic and opportunistic organisms, containment of biological products, hazardous materials, allergens and bioaerosols, elimination of intracage contaminants and control and maintenance of an optimal microenvironment. The invention should also have the effect of improving laboratory animal housing conditions.

The health quality of research animals has recently improved enormously, creating a need for specialized caging equipment. Animal suppliers around the world have experienced an unprecedented demand for defined pathogen-free animals, and are now committed to the production and accessibility of such animals to researchers. The needs for improvement and technological advancement for efficiently, safely and comfortably housing laboratory animals arise mainly from contemporary interests in pathogen-free, immunocompromised, immunodeficient, transgenic and induced mutant ("knockout") animals. Transgenic technologies, which are rapidly expending, provide most of the animal populations for modeling molecular biology applications. Transgenic animals account for the continuous success of modeling mice and rats for human diseases, models of disease treatment and prevention and by advances in knowledge concerning developmental genetics. Also, the development of new immunodeficient models has seen tremendous advances in recent years due to the creation of gene targeted models using knockout technology.

The number of publications on these subjects has increased from 64 for transgenic and one for knockout in 1986 to 1726 and 496, respectively, in 1996, based upon a Medline search. Further projections through Medline search trends predict that about 2454 papers will be published in the year 2001. Estimating the numbers of animals required at 200 per report, this means an estimated 500,000 mice will need to be maintained under proper barrier caging. The pharmaceutical industry presents new trends in research, resulting in a marked shift from acute to chronic disease studies. They incorporate the technology of genetic engineering into the traditional medicinal chemistry research process.

Unfortunately, transgenic animals are very often contaminated or "dirty" animals, because of the lack of proper animal care facility resources to protect the health of the newly-created animals. The current scientific advances and opportunities raise complex questions that must be addressed by researchers and animal care professionals. These questions include how to manage risks to compromised animals, to research personnel and the society at large of animal-to-human disease transmission through genetic manipulation, and how and whether to provide adequate resources for research and breeding applications of the new mutants. It has been suggested that animals expressing pathogenic transgenes may suffer from unique diseases. In light of the risks of transmission of disease to the animal users, some mechanism is needed to ensure attention to adequate biocontainment and health protection of transgenics and knockout mutants for minimizing exposure and for continued contamination control. Also, it is essential to consider that infectious agents, opportunistic organisms, allergens, airborne contaminants, fomites and environmental factor fluctuations have the potential to induce animal stress and diseases and variability in research or testing data. Animals become more vulnerable to diseases and more susceptible to human and cross-contamination as we use immunocompromised and genetically altered mutants.

Scientists refuse to use animals that are not healthy and cared for properly. Illness, undue stress or poor living conditions would interfere with obtaining valid, useful results from scientific experiments using animals. In brief, excellent science requires excellent care. The value of the animals used in biomedical research has increased substantially with the advent of gene transfer technology. For instance, the cost of a single transgenic white mouse could easily exceed $100,000 when the time and effort required to effect a successful gene transfer is considered. (Cooper, "Design Considerations for Research Animal Facilities," Lab Animal, September 1989, pp. 23–26.) These lines of animals are not only extremely valuable but also frequently irreplaceable. Therefore, they need to be provided with the highest quality environments and protected from cross-contamination. The living conditions for such animals must be kept at or near their ideal environment. Therefore, barriers at cage level must be provided to ensure both exclusion and containment in environments appropriate for the species. Transgenic technology will certainly become more important in the future, and with the contemporary world harmonization of animal welfare standards, it is necessary to ensure that the animal's (product) investment is protected. The caging systems of the present invention will satisfy scientific expectations.

These new laboratory technologies require a larger number of animal cages to be maintained in the same floor space. The present invention provides means of reducing facility construction costs and animal husbandry-related expenses without jeopardizing the quality of the care provided to the animals or the value of the scientific research conducted. Transgenic colony management is very expensive, especially at a time when animal rights activism is increasing research animal care costs. As animal purchase and maintenance costs steadily increase while grant funds decrease, cost containment of the transgenic colonies used in research becomes increasingly important. Since labor is the greatest single cost, reducing labor is the key to reducing overall costs. Since specialized microisolation cages and labor costs are both significant, substantial reduction of caging costs will help to accomodate research users. For example, as with long-term testing and the associated risk of losing a colony, research managers are required to decide whether to use mass air systems and whether they need clean rooms, with their high installation costs, to provide high quality animals and avoid possible losses of time and data. Installing clean rooms can require expenditures of $400 to $500 per square foot, so the availability of the caging systems of the present invention will reduce these costs by offering protection similar to a mass air room, but at cage level. The present invention also provides a type of automation for changing cages, to eliminate the cost of bedding and bedding-related activities including bedding ordering, receiving, storage, dispensing, autoclaving, dust removal, bedding disposal, cage-scraping, bagging, disposal and removal of soiled bedding.

Many animal pathogens can become airborne or travel on fomites such as dust. Therefore, open-system caging operations present a risk of contamination. Most research institutions are presently caging mice in filter-top cages (at a cost of about $65 per cage plus $140 for ancillary equipment), which have been shown to reduce concentrations of airborne pathogens as well as allergens, compared with conventional open-top cages (which cost about $40 per cage plus $30 for ancillary equipment). Rodent cages with filter-tops create a contaminant barrier at the cage level. However, they restrict ventilation, prevent heat dissipation and affect the quality of animal research data. Ventilated (positive pressure, open system) cage and rack systems (which cost about $130 per cage plus $150 for ancillary equipment) that protect animal health and reduce exposure to airborne contaminants are commercially available. However, they are expensive and leak pathogens into the workers' environment. Cage and rack systems that exhaust air through a HEPA filter system before returning it into the room substantially reduce the concentration of airborne allergens, but are very expensive (about $200 per cage plus $150 for ancillary equipment). Such cage and rack systems are used in barrier animal facilities, which cost around $400–600 per square foot. Besides increasing the cost of housing mice significantly, such systems tend to invalidate research data and adversely affect animal well-being. They are still open systems which leak into the work environment, thus exposing both animals and workers to potential risks of contamination and allergies. In proportional terms, caging mice in filter-top cages costs approximately 293 percent more than caging them in open cages. Caging in HEPA ventilated cage and rack systems costs about 400 percent more, while caging in HEPA-ventilated in-and-out cage and rack systems would cost about 500 percent more.

In addition to protecting animals from extraneous cross-contamination, there is a need to isolate laboratory personnel from allergens that are indigenous to a species or hazardous agents that are experiment specific. For example, many technicians and scientists are troubled by allergic reactions to animal dander. Allergens are also found in the urine of mice and rats. There is also the threat of contracting contagious diseases that are present in animal studies. Animals may become contaminated at the research facility or in transit, where they are exposed to the outside environment.

As reported in the Denver Post, Jan. 1, 1998, two researchers at the Yerkes Regional Primate Research Center of Emory University have recently been exposed to the hepatitis B virus via contact with caged research monkeys, and the first worker died Dec. 10, 1997. In an era when research animals are infected with various virulent diseases, clearly it would be desirable to provide improved protection to research staff, which can be accomplished by the caging systems of the present invention.

The current technology (as described in U.S. Pat. No. 5,190,879) for isolating small laboratory animals in research facilities includes filtered air hoods, filtered air housing units and filtered air rooms. These systems are very expensive and are stationary in nature. There is currently a trend towards the use of micro-isolation cages, in which only the food, water and bedding have to be changed in a horizontal flow Class 100 air displacement bench or the like. The isolator caging system uses a standard solid bottom (shoebox) cage equipped with a filter top. The top consists of a polycarbonate frame fitted with a piece of filter media. It is made of a spunbonded polyester material known as Reemay™ filters that have different particle arrest capabilities. The fabric's ability to pass air is inversely proportional to its particle arrest capability.

Cage manufacturers use different types of Reemay filters, but the most current are the 2024, 2033 and 2295. The Reemay 2024 has an 85 percent atmospheric dust removal efficiency for particles in the 1 to 5 micron range but only a 28 percent efficiency for particles in the 0.3 to 1 micron range. The rim at the bottom of the filter top, where it fits over the underlying cage, is made of a lip, forming a junction design similar to that in a Petri dish. (Lipman, "Microenvironmental conditions in Isolator Cages, An Important Research Variable," *Lab Animal*, June, 1992, pp. 23–26.) Despite the large exposed filter surface area and the permeability of the filter media, studies have shown that the air exchange in isolator cages does not take place through the filter, but at the junction of the lid with the cage. Additionally, the results showed that the filter top reduced air exchange rates within the cages to less than one air change per hour (ACH) regardless of the ACH rate provided in the animal room. (Keller et al., "Evaluation of Intracage Ventilation in Three Animal Caging Systems," *Lab Animal*, Vol 39, pp. 237–242, 1989) These caging systems clearly impede intracage ventilation and can lead to an unhealthy microenvironment.

Also available are filter tops that are constructed of pressed pulp. The pressed pulp forms a dense mat of wood fibers that acts as a depth filter to block the passage of microbial contaminants.

There are a variety of gaseous and particulate contaminants that accumulate in the animal's environment. The sources of this pollution include thermal loads generated by metabolic activity, moisture generated from respiration, excrement, and the water source, ammonia generated by bacteria from the breakdown of urea found in excrement, and carbon dioxide generated as a metabolic waste product. These pollutants all need to be removed or diluted via ventilation or else there is a significantly poor microenvironmental air quality. As the magnitude of the differences between isolator cage macro- and microenvironmental conditions became apparent, cage manufacturers developed caging systems that are supply-coupled or directly ventilated, as opposed to the room-coupled or passively ventilated systems described above. (Lipman, supra, 1992)

The use of rodent caging systems that provide individual ventilated isolator cages is rapidly increasing. These systems have been shown to considerably improve the microenvironmental conditions to which rodents are exposed. Ventilated caging systems have also been shown to enhance containment capability at cage level, reducing the opportunity for cross-contamination. In general, these systems provide filtered air directly into the cage, thereby pressurizing it. The positive pressure differentials increase the amount of allergens released into the atmosphere, which may increase the risk of allergies developing in research or animal care personnel. Caging systems may be purchased with exhaust systems that scavenge air as it exits from the junction of the cage top and bottom and/or the cage top filter. Because of a junction design similar to that of a Petri dish, no ventilated system is capable of scavenging all the air escaping from the cage. (Tu et al., "Determination of Air Distribution, Exchange, Velocity and Leakage in Three Individually-Ventilated Rodent Caging Systems," *Contemporary Topics*, Vol. 36, pp. 69–79, 1997) Air leakage and release of intracage air into the room is an important source of airborne contamination.

The use of laboratory animals in research is increasing rapidly, putting research and testing institutions at ever-increasing risks of occupational health litigation. Employee health problems and occupational hazards caused by animal allergens have become a significant concern at many research facilities. Laboratory animal allergy (LAA) is an important occupational disease that affects between 15 and 44 percent of workers in animal care facilities. (Eggleston, "Death by Dander: Laboratory Animal Allergies in the Workplace," PRIM & R Meeting, San Diego, Calif., Mar. 17, 1997; Olfert, "Allergies to Laboratory Animals— Aspects of Monitoring and Control," *Lab Animal*, February 1993, pp. 32–35) Currently, it is reported that fifty percent of animal-exposed laboratory research personnel exhibit allergies to the laboratory animals, and three fourths of all institutions with laboratory animals now have animal-care workers with allergic symptoms. For example, a recent study performed at the Karolininska Institute in Sweden revealed that nearly 50 percent of animal-exposed personnel evidenced allergies to lab animals. Up to 73 percent of persons, including scientists and animal-care personnel, with pre-existing allergic conditions such as allergic rhinitis (hay fever) eventually develop allergies to laboratory animals. Ten percent of these persons develop occupation-related asthma. Currently in the U.S., approximately 35,000 workers and 500,000 scientists have been exposed to laboratory animal allergens. These people could be eligible for medical and indemnity compensation. Workers' compensation claims related to animal allergies are estimated at about $50 million for the past three years. Despite these statistics, there appears to be no effort to develop closed-system (leak free) caging and work area technology.

Personnel who are exposed to animal allergens react in such ways as allergic dermatitis, respiratory allergic diseases and anaphylactic syndrome. The asthmatic reactions that are associated with the illness may be life threatening, and chronic occupational asthma can be associated with irreversible lung disease. This is an IgE mediated immune response to allergenic proteins that are produced by the animals and become airborne on small respirable particles. Exposure to laboratory animal fur or dander, saliva, serum or other body tissues should be minimized. This is a legitimate biological concern, and yet there are no technological alternatives. Animal caging with special air filtration for intake and exhaust, contamination-free environments and good air quality systems are the most efficient methods of containing such respirable particles. The annual costs of LAA illnesses could be enormous, including both medical and disability costs and lost productivity. By eliminating allergen exposures in the workplace, it would be possible to improve worker health, maintain animal health and reduce operating costs. The caging systems of the present invention are expected to meet institutional expectations.

The lack of control of environmental conditions such as temperature, relative humidity, ventilation rate and illumination at the animal cage level prevents proper validation of research and testing data and adversely affects animal well-being. The chilling and dehydration of rodent neonates, hairless and nude strains in mechanically ventilated caging systems have caused animal losses due to hypothermia. Thus, there is a growing need for improved caging systems which would safeguard the health of both the laboratory animals and their keepers. Furthermore, keeping social animals such as rodents permanently in barren cages is unacceptble for ethical, professional and scientific reasons. It deters the animals from expressing their normal behaviors and favors stereotypic behaviors instead. It is thus desirable to provide environmentally enhanced caging systems to improve the well-being of laboratory animals and the quality of research conducted on them.

Cages currently used to isolate rodents resemble a Petri dish and have filter tops. They are known as microbarrier (Allentown Caging Equipment, Inc., Allentown, N.J.) or microisolator (Lab Products, Inc., Seaford, Del.) cages. These cages have a proven isolation capability, but restrict ventilation to less than one air change per hour, thus providing poor air quality. These cages still leak airborne contaminants and allergens into the occupational environment. Regardless of the number of air changes per hour in the room, such cages operate the same because of the cage top design. Cage ventilation in filter-top cages is driven by thermal and moisture diffusion through the filter top and by convection across the cage. There is no other escape for thermal currents created by the animals in the cage. Computational fluid dynamics has been used to study filter-top cages in a six-shelf rack with seven cages per shelf. The thermal currents and cumulative effect of metabolic heat load, moisture and toxic gases across the rack were evaluated for each of the 42 cages for five racks. An animal room was set at 66 deg. F., 50% relative humidity and 15 air changes per hour with a changing station in it. It was discovered that there is a lack of consistency from position to position of cages on the same rack and across the room, depending upon where air diffusers and exhausts are located. Nevertheless, depending upon the lower or higher locations of the cages on the rack, microenvironmental variations were noted on the order of 3 deg. F., 10% in relative humidity, 2.256 ppm carbon dioxide, 4.8 ppm ammonia and two times less air changes/hour. The heat stratification from accumulated hot and humid air creates a barrier inside the tops of the cages and under each shelf, affecting the thermal currents. Even though sufficient chilled air is supplied to the room, the chilled air cannot penetrate the barrier of hot air trapped within the cages and under the shelves.

The caging system is an important factor in the physical environment of laboratory animals, the microenvironment. Microenvironmental conditions lack similarity to animal room conditions, the macroenvironment. Animal Welfare regulations (AWA, Guide) prescribe room (but not cage) temperature, humidity and ventilation settings as well as solid bottom cages for microenvironmental animal comfort. There are three types of solid-bottom caging systems currently used in animal facilities. Two types of shoeboxes are room-coupled in a static mode: cages with open tops and cages with filter tops also called microisolator cages. The third type is a shoebox with filter top individually coupled to blower supply and/or exhaust modules and distribution plenums on a rack. Solid bottom cages with open tops provide 10 to 16 air changes per hour (ACH), regardless of the room ventilation (Reeb, C. K. et al., 1997). The thermodynamics of convection and diffusion from the thermal updraft by the heat load of the mice create the airflow. The open top cage provides microenvironmental comfort but lacks isolation, containment, and enrichment capabilities. With 5-mice residing in a static microisolator cage, the air velocity is 0.05 cfm, providing 0.02 air change per hour with 4° C. temperature rise (Riskowski et al., 1996). This static filter-top cage has a filter membrane, making the airflow independent of room ventilation. The filter top restricts convection and diffusion thermodynamics with the resultant accumulations of temperature, humidity, ammonia, and carbon dioxide over time. The filter-top cage thus provides isolation but lacks microenvironmental comfort, containment, and enrichment capabilities (Keller et al., 1989, (Maghirang, R. G., 1995, Memarzadeh, F., 1998, Riskowski et al., 1996, Reeb, C. K. et al., 1997, Serrano, L. J., 1971). Ventilated filter-top cages provide 40 to 100 ACH depending on manufacturers. Pressurization of the cage by "high-efficiency particulate air" (HEPA) filter/blower supply and/or exhaust modules is independent of room ventilation. Velocities up to 100 fpm (air at 20° C. and moving at 60 linear fpm has a cooling effect approximating 7° C.) in the cage have been recorded, thus inducing cold stress. The individually ventilated filter-top cage provides isolation but lacks microenvironmental comfort, containment and enrichment capabilities (Huerkamp, M. J. and Lehner, D. M., 1994, Lipman, N. S. et al., 1993, Novak, G., 1997, Tu, H. et al., 1997).

Since all three types of caging systems are independent of room ventilation settings, air handling systems are designed to condition macroenvironment or the human occupied zone only. Air handling or HVAC (heating, ventilation, air, conditioning) systems are the most costly component of any animal facility, often consuming 40 to 50 percent or more of the construction budget (Hughes and Reynolds, 1995). Applicant has considered means to create a cost-effective caging system that could be room-coupled, function in a static mode, and be coupled to the building HVAC exhaust system.

Computational fluid dynamics (CFD) is a software analysis tool. It uses equations of the conservation of mass, momentum, and energy, which essentially say, "what goes in must come out" (Hughes and Reynolds, 1995). This application describes CFD output used to facilitate the design process and predict air movement in a new type of caging system. Contours, vectors, and particle tracks are examined to adjust microenvironmental comfort. The goal was to meet or exceed all current guidelines and regulations at the cage level, while innovating in cost-effective and appropriate caging systems.

Application of CFD has demonstrated that vented filter-cages with closed-tops can provide 6 to 30 ACH depending on the chosen filter materials and the room ventilation settings. The thermodynamics of convection, buoyant flow and conservation of mass from the thermal updraft resulting from the heat load of the mice create the airflow that is dependent upon room ventilation. This vented closed-system for mice caging is believed to be the only one that will provide microenvironmental comfort, isolation, containment, and enrichment. Applicant conducted a qualitative and quantitative analysis of air distribution pattern, velocity, air change per hour, and leakage in these cages. Also studied were temperature, thermal loads from metabolic activity; humidity, moisture from respiration, wastes, and water source; ammonia, from bacterial breakdown of urea in excrement; and carbon dioxide, as a metabolic waste product, all were monitored over a two week period.

Standardized testing methods for characterizing the design and operation of ventilated caging systems were used by Tu et al. (1997) to define and quantify differences in air distribution, exchange, velocity, and leakage in three commercially available systems. These methods are also published as the National Sanitation Foundation Standard 49 for Class II (Laminar Flow) Biohazard Cabinetry (Ann Arbor, Mich., 1992). The concept is particularly relevant since the driving force for the flow is a result of buoyancy due to temperature gradients. In this case, five mice generate heat loads of 2.0265 Kcal/hr and moisture of 2.5 g of water/hr. Use of laminar convection flow to ventilate the microenvironment through filter membrane would eliminate gaseous buildup and provide good air quality within the enclosure. Therefore, natural convection airflow should provide an efficient room-coupled 'closed-system' method for producing adequate microenvironmental ventilation and efficient microbiological barrier at cage level, i.e. provide product and personnel protection.

Subsequent to the filing of the above-identified provisional application, a literature search was performed concerning mice caging, particularly relating to room air distribution and the relationship between macro- and microenvironments, effects of ambient temperature on growth, and moisture production of mice. The following brief summaries discuss pertinent publications.

The *Guide for the Care and Use of Laboratory Animals*, Institute of Laboratory Animal Resources (1996), National Research Council, National Academy Press, pp. 23–55, discusses macro- and microenviroments for lab animals, including temperature and humidity conditions and the determination of optimal ventilation rates.

Reeb et al. in "Impact of Room Ventilation Rates on Mouse Cage Ventilation and Microenvironment," Contemp. Topics Lab. Anim. Sci., Vol., 36, pp. 74–79 (1997) present a study of non-pressurized, bonnet-topped mouse cages housing four mice each. The effects of room ventilation rate on various aspects of the microenvironments in the cages were examined, and it was found that increasing the room ventilation rate beyond 5 ACH did not result in significant improvements in the cage microenvironments.

Maghirang et al. in "Development of Ventilation Rates and Design Information for Laboratory Animal Facilities," Part I—Field Study, ASHRAE Transactions, Vol. 101, Pt. 2, RP-730 (1995) discussed a survey of animal facilities and their characteristics. It was found that cage conditions varied widely among cages within the same room and among similar cages in different rooms; Cage type was the most important factor that influenced cage conditions and uniformity in cage conditions; and room air exchange rate, air velocity approaching the cage, number of returns and diffusers, and diffuser type did not significantly influence cage conditions and uniformity in cage conditions.

Riskowski et al. in "Development of Ventilation Rates and Design Information for Laboratory Animals Facilities," part 2—Laboratory Tests, ASHRAE Transactions, Vol. 102, Pt. 2, RP-730 discussed the results of tests of conditions in animal rooms and within animal cages at selected locations in the rooms. Conclusions included: Cage conditions varied widely with cage location in a room; Cage type was the most important factor that influenced cage conditions; and Room ACH values from 5 to 15 had the same effects on cage conditions, so the higher room air exchange rates did not provide better conditions for the animals.

Perkins et al. reported in "Characterization and Quantification of Microenvironmental Contaminants in Isolator Cages with a Variety of Contact Bedding," Contemp. Topics Lab Anim. Sci. Vo.. 173, pp. 96–113 (1995) the results of studies of isolator-type cages housing mice with eight different contact beddings. The presence of ammonia and other environmental contaminants was studied.

Choi et al. in "Effect of Population Size on Humidity and Ammonia Levels in Individually Ventilated Microisolation Rodent Caging," Contemp. Topics Lab. Anim. Sci., Vol. 33, pp. 77–81 (1994), discuss the effects of population size on the buildup of ammonia and humidity in individually-ventilated microisolation cages over time as compared to static microisolation cages.

Hasenau et al. in "Microenvironments in Microisolation Cages Using BALB/C and CD-1 Mice," Contemp. Topics Lab. Anim. Sci., Vol. 32 (1) pp. 11–16 and 32 (2) pp. 58–61 (1993) report the results of studies of four different mouse caging systems for microenvironmental temperature, humidty and ammonia levels.

In Sato et al., "Dehumidification of Ventilation Air in a Barrier Maintenance System for Laboratory Animals," Lab. Anim. Sci., Vol. 39, pp. 448–450 (1989) and Wu et al., "A Forced-Air Ventilation system for Rodent Cages," Lab. Anim. Sci., Vol. 35, pp. 499–504 (1985) it was reported that ammonia is produced in greater amounts under conditions of high humidity. Desiccation was shown to be helpful in the prevention of ammonia and humidity accumulation.

Corning et al. in "A Comparison of Rodent Caging Systems Based on Microenvironmental Parameters." Lab. Anim. Sci. Vol. 40, pp. 498–508 (1991) describe two studies of four different mouse caging systems, evaluating them for microenvironmental temperature, carbon dioxide, relative humidity and ammonia levels. The cages evaluated were filter lid vs. open lid types.

Serrano reports in "Carbon Dioxide and Ammonia in Mouse Cages: Effect of Cage Covers, Population and Activity," Lab. Anim. Sci. Vol. 21, pp. 75–85 (1971) on a study of the effects of rod, wire-mesh and fibrous filter-type covers on diffusion or convection of gases produced in mouse cages. It was found that filter or mesh covers had major influences on the composition of air in the cages.

Keller et al. in "An Evaluation of Intra-Cage Ventilation in Three Animal Caging System," Lab. Anim. Sci. Vol. 39, pp. 237–242 (1989) report on a study of air distribution and air turnover rates in unoccupied shoebox mouse cages, filter-top covered cages and shoebox mouse cages housed in a flexible film isolator. They concluded that although filter-top covered cages reduce the cage-to-cage transmission of disease, the poor airflow observed within these cages could lead to a buildup of gaseous pollutants that may adversely affect the animals' health.

Tu et al. in "Determination of Air Distribution, Exchange, Velocity and Leakage in Three Individually Ventilated Rodent Caging Systems," Contemp. Topics Lab. Anim. Sci. Vol. 36, pp. 69–73 (1997) report on a study of individually ventilated rodent cages. The inefficiency of exhaust scavenging from such systems compromises their suitability for use with hazardous agents. Also, chilling and dehydration resulting from air velocity can result in animal losses due to hypothermia.

Applicant's literature review identified the following important factors in controlling the macro- and microenvironments for caged rodents:

Genetic heritage and environmentally-influenced biological responses.

Ventilation in filter top cages does not necessarily increase with increasing room ventilation air exchange rates.

Filter tops can significantly affect cage ventilation performance.

Cage conditions varied widely with cage location in a room.

Desiccation was shown to be helpful in the prevention of ammonia and humidity accumulation.

Improved cage washing procedures and animal room cleanliness may reduce the concentrations of bacteria that produce ammonia.

Bedding type can significantly affect ammonia generation.

A recent study suggests that groups of five mice display a behavioral and autonomic thermoneutral zone that is similar to individual mice, including a temperature warmer than standard housing temperatures. This suggest that groups of mice may experience cold stress under standard housing conditions.

Ammonia concentration can be reduced by increasing the supply air temperature.

SUMMARY OF THE INVENTION

It is an aspect of the present invention to provide a suitable, cost-effective closed-system cage assembly for small mammals such as rodents which prevents the transfer of contaminants to or from the system. Preferably, natural convection flow will be used.

Another aspect of the invention is to provide closed-system storage systems for biological materials, plants or the like which prevent the transfer of contaminants to or from the systems.

It is a further aspect of the invention to provide means for isolating such animals, in transit as well as in the laboratory, from bacteria, viruses and other pathogenic or potentially pathogenic agents.

Another aspect of the invention is to provide means for protecting animals in transit, and those exposed to them, at minimal expense and effort.

Still another aspect of the invention is to provide means for protecting and isolating animals in transit and in the laboratory from pollutants or contaminants while allowing free exchange of gases without developing excessive temperatures within the containers.

Broadly, the present invention encompasses an isolation container comprising a base which supports a plurality of sides, a top affixed to the sides forming a micro-isolation container suitable to house a heat load, one of the sides having an intake port with a filter membrane and a second side having an exhaust port with a filter membrane, the exhaust port being located higher relative to the base than the intake port on an opposite side, thereby facilitating a convection based air flow from the intake port, across the container, and out the exhaust port.

Preferably the isolation container has four sides forming a rectangle, with the intake and exhaust ports located at opposite ends on a pair of shorter sides, and the inner surface of the top slopes upward from the intake port side to the exhaust port side.

The present invention includes a rectangular isolation container comprising a base made of transparent material and having an air intake port covered with a filter membrane at the front end and a detachable top sealingly attached to the base. The container has an air exhaust port covered with a filter membrane and located on the rear end of the container, opposite the front end of the base. The interior of the top forms a domed sloping ceiling for the container, with the lower portion located adjacent to the intake end and the upper portion being adjacent to the exhaust end. The interior of the top is preferably smooth, nonporous and reflective to aid in the flow of gases through the cage.

The preferred embodiment of the present invention is a cage shaped like a rectangular box and incorporating ventilation ports in the lower and upper portions, respectively, of opposite ends of the box. The ventilation ports are preferably covered with filter membranes.

In accordance with the invention, the cage comprises a rectangular base made of a transparent material and a detachable top. The base includes a ventilation port in the lower portion of one end (front) surface (the intake port), and the base or top includes a similar ventilation port in the upper portion of the opposite (back) end (the exhaust port) from the intake port. When assembled, the top and base are attached in an air-tight manner to prevent any flow of air between the cage interior and the outside. The cage is thus a closed system which is room-coupled via the intake and exhaust ports and filter membranes. An optional exhaust nozzle can be attached to the exhaust port. The exterior of the cage is rectangular to facilitate stacking of the cages in use. The interior of the top is contoured to provide a sloping domed ceiling, with the lower portion adjacent the intake end of the cage and the upper portion adjacent the exhaust end. This creates a suitable convection laminar flow of air through the cage, as discussed in detail below.

Preferably the base incorporates a floor and waste disposal system comprising a perforated cage insert and a disposable waste bag attached to a cage bottom liner. The liner is made of absorbent material treated to prevent the growth of microorganisms and the generation of dust. Attached to the liner are support members which support the cage insert at a suitable level above the liner. A feeder assembly comprises a slotted V-shaped rack for holding feed and suitable perforated supports. Preferably, the supports comprise perforated tubes which can be used by the occupants for shelter. The tubes can optionally be transparent also. Suitable means are provided for securing the feeder assembly in position. Proper design and placement of both the feeder and the perforated tube supports promote laminar air flow through and across the enclosure toward the exhaust port. The feeder assembly also preferably incorporates an attachment point for a water sipper tube extending from a water bag or bottle which is mounted in a recessed portion of the top at the intake end of the cage. A detachable elastomeric securing and carrying strap is provided to secure the top to the base.

Other aspects of this invention will appear from the following description and appended claims, reference being made to the accompanying drawings forming a part of this specification wherein like reference characters designate corresponding parts in the several views.

BRIEF DESCRIPTION OF THE DRAWINGS

FIG. 7 is a sectional detail view of the seal between the top and base of the assembled cage;

FIG. 8 is a sectional view of an alternate embodiment of the seal of FIG. 7;

FIG. 9 is a sectional detail view of the intake and exhaust filter materials;

FIG. 10 is a sectional detail view of an alternate embodiment of the filter material of FIG. 9;

FIG. 14 is a top perspective view of the end cage support structure;

FIG. 15 is a top perspective view of the middle cage support structure;

FIG. 16 is a partial perspective view of an alternate embodiment of the middle cage support of FIG. 15;

FIG. 17 is a partial perspective view of an alternate embodiment of the cage end support of FIG. 14;

FIG. 18 is an end view of the middle cage support of FIG. 15;

FIG. 19 is an end view of the end cage support of FIG. 14;

Before explaining the disclosed embodiment of the present invention in detail, it is to be understood that the invention is not limited in its application to the details of the particular arrangement shown, since the invention is capable of other embodiments. Although the preferred embodiment is designed for isolating plants and animals, including mammals, reptiles, amphibians, fish and birds, in alternative embodiments the containers can be used for bacterial, yeast, plant or animal cell cultures. Also, the terminology used herein is for the purpose of description and not of limitation.

DESCRIPTION OF THE PREFERRED EMBODIMENTS

In discussing the cage system of the invention, the top or upper portions, the lower or bottom portions and the front (intake) and rear (exhaust) ends will be used as a frame of reference.

The caging system of the present invention provides performance efficiency, reliability, cost-savings and animal comfort. It is a unique closed-system design that promotes laminar convection air flow through individual cages and across the storage rack. The caging systems of the invention assure:

1) exclusion of all pathogens by keeping the animals "clean," free of infectious agents, opportunistic organisms, contaminants and pollutants;

2) containment of potential sources of contamination such as gases, particulate matter, allergens and fomites, thus avoiding cross-contamination and occupational health hazards;

3) elimination of contaminants from feed, water, bedding/nesting materials and waste, thus preventing adverse effects on physiological defects, diseases and data variability; and 4) creation of a stable environment appropriate for the lab animals by providing optimal microenvironmental conditions and animal comfort in a spatially-enhanced and enriched environment.

In the present invention, a filtered closed-system design with good air quality coupled with a waste disposal system enhances sanitation, reduces cage changing and cleaning, eliminates the cost of bedding material and its handling and provides the opportunity to develop safe procedures for cage changing and waste disposal operations.

Figure 1:
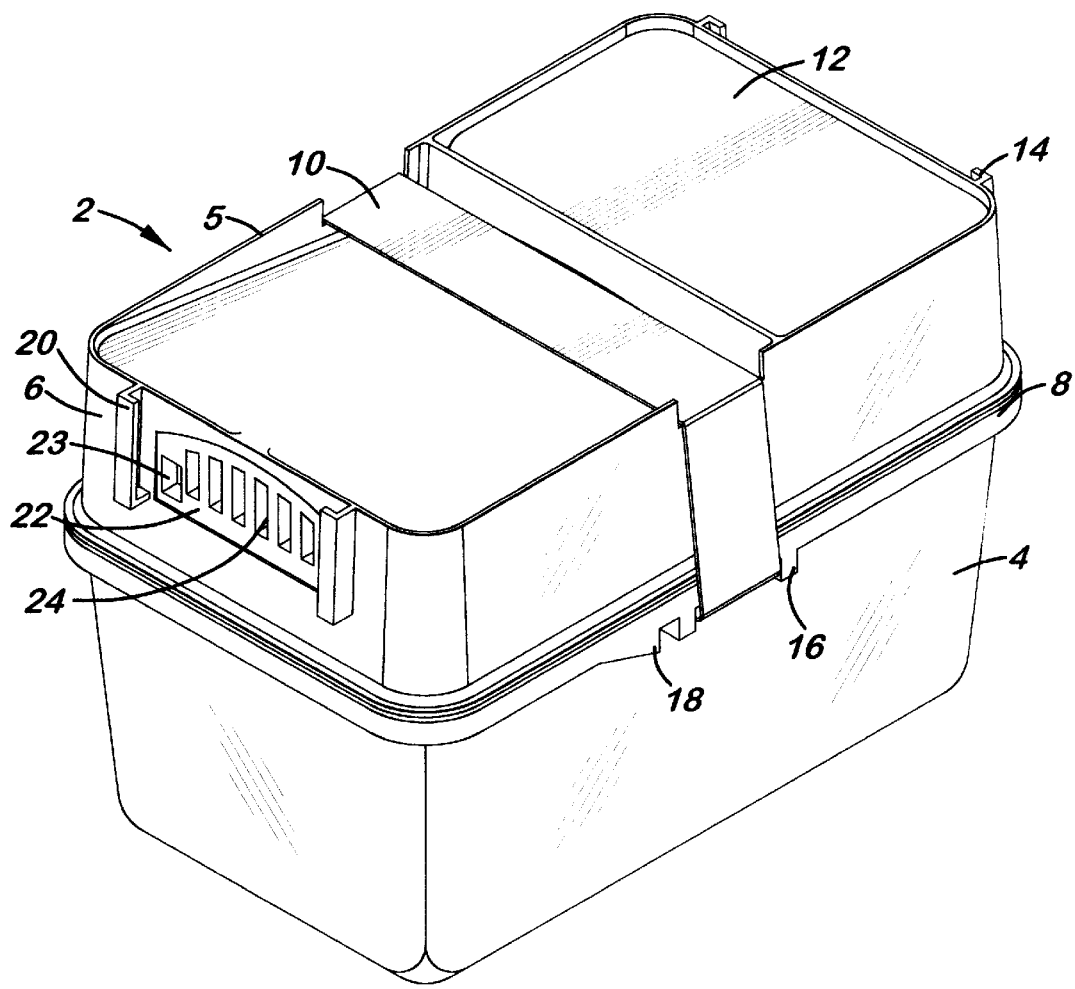
FIG. 1 is a top perspective view of the assembled cage in the preferred embodiment.
Figure 2:
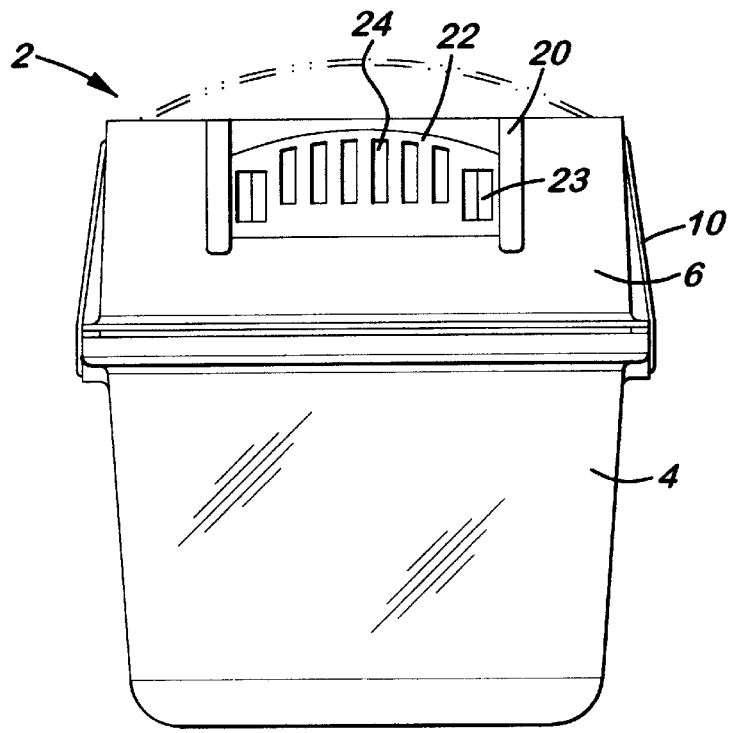
FIG. 2 is an end view of the exhaust port or rear end of the assembled cage of FIG. 1.
Figure 3:
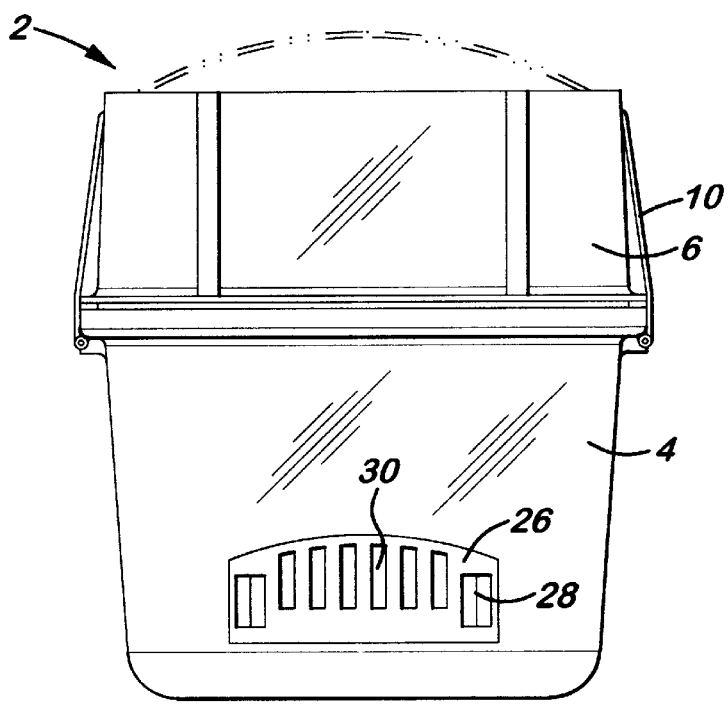
FIG. 3 is an end view of the intake port or front end of the assembled cage of FIG. 1.

Turning now to the drawings, FIGS. 1 to 6 illustrate a complete cage system of the invention. The rectangular cage (2) includes a base (4) of a transparent material. Any suitable transparent material can be used, including glass, but preferably a moldable polymeric material such as high temperature polycarbonate is used to facilitate molding and sterilization of the finished cage. Such materials will withstand autoclave temperatures of about 275 deg. F. The top (6) is made of the same or a similar material. Base (4) has an intake port (7) at the front end which is preferably covered by protective grid (26), secured by clips (28). The grid protects a filter membrane (30), the details of which are discussed below. Base (4) also includes an attachment pin or other device (16) for attaching a combination securing and carrying strap (10) of an elastomeric material such as rubber or silicone polymers. FIGS. 2 and 3 show strap (10) in an extended position. The base (4) also includes a widened portion and notch (18) to facilitate mounting the cage(s) on a system of shelfless brackets, discussed below.

The top (6) also contains an exhaust port (19) at the back end of the cage, covered by grid (22) which is secured by clips (23) and protects a filter membrane (24). Brackets (20) are provided for attaching an optional exhaust nozzle (25), described below and illustrated in FIG. 5. The top also includes clips or brackets (14) for mounting an information card (27) on the cage. The top surface of top (6) is recessed at the front end (38) to provide space for a flexible water bag (12). The edges (5) of top (6) form a level contour to facilitate stacking of the cages. The water bag has a tube (32) which passes sealingly through hole (34) in top surface (38) of the top (6). The tube (32) becomes water sipper tube (36) which is preferably supported by brackets (40) on feeder structure (42), and provides water to the resident animals. Alternatively, water sipper tube can be attached directly to feeder structure (42). The water tube also helps to hold the feeder structure in position within the base of the cage. The water bag is constructed from a flexible, nonporous polymeric material such as a suitable fluoropolymer. Such materials are chemically-resistant and non-toxic and will not contaminate the water. A suitable wall thickness is about 5 mils. The bags are sealed on all four sides and have a valve or fitting installed on one wall. Suitable fittings can include an on/off valve which will accept flexible tubing or septum fitting which can be used with a hypodermic needle.

A protective grid (44) is provided inside the cage top to protect exhaust filter membrane (24) from any scratching or gnawing by the resident animals. The grid can be made of any suitable gnaw-resistant material, including stainless steel or polycarbonate polymers. Top surface (38) of the cage top forms a sloping, domed ceiling for the cage. By sloping upward from the intake or front end of the cage to the exhaust or rear end, the ceiling encourages thermal air currents resulting from the body heat of the resident animals to provide a laminar convective air flow from intake to exhaust ports. The domed ceiling, which is higher along the centerline than at the edges of the top, helps to achieve the same effect. The surface of the domed ceiling can be reflective to improve the flow of gases in the cage.

FIG. 9 shows a cross section of the filter membrane (30) used for the intake and exhaust filters. This material is discussed in detail below. FIG. 10 illustrates an alternate embodiment in which the membrane (30) is protected on at least one side by protective material (41) such as wire mesh or the like. This serves to protect the filter membrane (30) from damage in handling or from contact with the resident animals.

Figure 11:
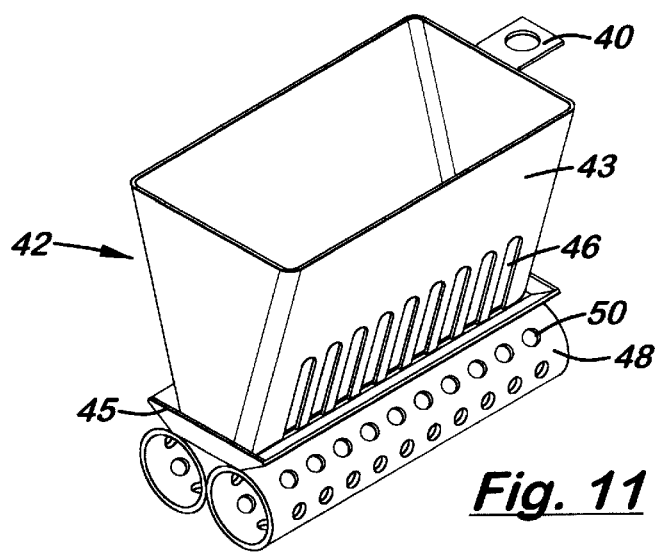
FIG. 11 is a top perspective view of the feeder structure.
Figure 12:
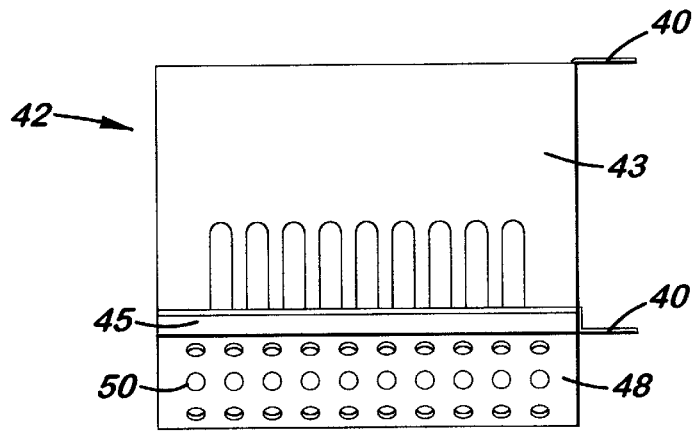
FIG. 12 is a side elevation view of the feeder structure.
Figure 13:
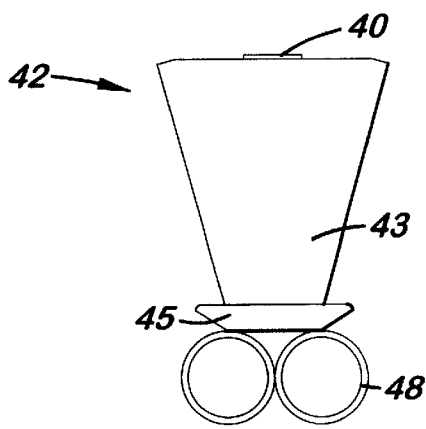
FIG. 13 is an end elevation view of the feeder structure.

Feeder structure (42), shown in detail in FIGS. 11 to 13, includes a V-shaped rack (43) containing feed slots (46). When stocking the cage, feed can be placed in the V-rack, either loose or in paper bags which the resident animals can gnaw through. Optionally, a powdered feed tray and air deflector (45) is provided to retain powdered feed and prevent it from being dislodged or contaminated by air currents. The feeder can thus handle either pelleted or powdered feed. The feeder structure base includes two open tubes (48) which form the base support for the feeder. These tubes serve a dual purpose in that they afford shelter to submissive animals which may flee more dominant animals, and the perforations (50) allow the animals to sniff each other and more readily reach social equilibrium. Preferably the tubes are transparent to facilitate interaction between the animals and observations by their keepers. Additionally, the support tubes promote laminar air flow across and through the enclosure toward the exhaust port. Brackets (40) position the water sipper tube (36) and help to secure the feeder in place. Any suitable non-toxic plastic or metal can be used for the feeder structure, but preferably it is made of nylon, polycarbonate or stainless steel.

The bottom of the cage base includes several components to meet the needs of the resident animals and their keepers and users. These are shown in detail in FIG. 6. Perforated cage insert (52) covers the other components and may include an upright portion (41) which protects the intake filter membrane (30) from the animals. The cage insert can be made of any suitable non-porous material, preferably stainless steel or nylon. The cage insert is perforated to allow waste materials to fall to the cage bottom liner (54) below. Cage accessories such as feeder structure (42) and furniture can also be attached to the insert via the perforations. The cage bottom liner is formed of an absorbent material such as paper, wood fibre or the like and is designed to rapidly absorb moisture from waste materials from the bottom up. The non-contact absorbent liner material can be impregnated with particles of zeolites, non-zeolitic molecular sieves or the like to deodorize and absorb moisture and gas molecules. The liner material is preferably impregnated with an antibiotic (e.g. streptonycin, penicillin, or sulfa drugs) or antiseptic material to sanitize the waste materials as they are deposited. Liner (54) includes support members (58) which may be conical or any suitable shape to support the cage insert between its perforations. The assembly of cage insert and bottom liner is encased in a folded waste bag (56) which can be enfolded around both the insert and the liner and removed to clean the cage. The entire bag and assembly can then be sealed and discarded to minimize the exposure of attendants to allergens or other harmful agents generated by the resident animals. The waste bag can be made of any suitable non-porous flexible polymeric material, such as polyethylene.

Figure 4:
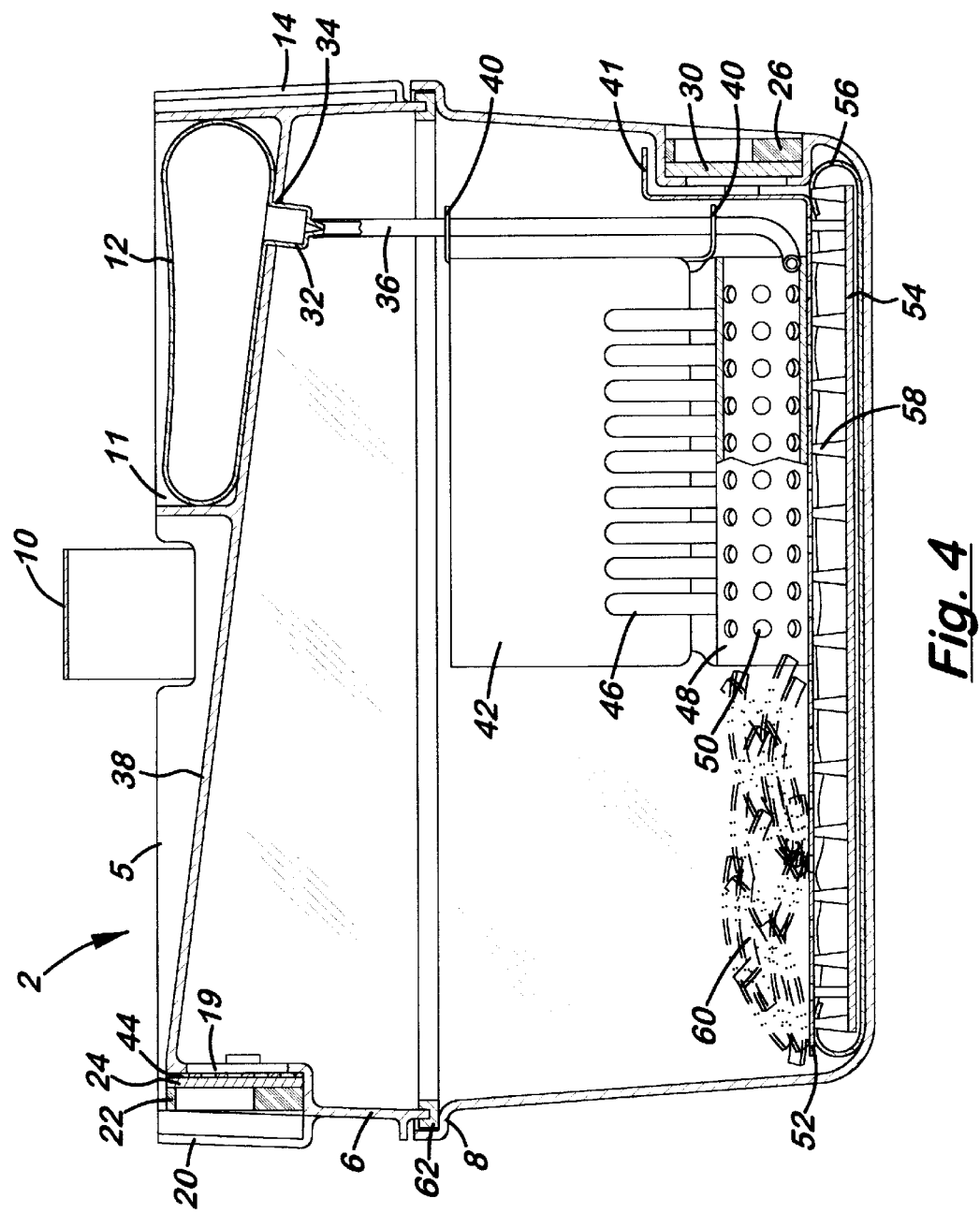
FIG. 4 is a longitudinal cross-sectional view taken along line 4—4 of FIG. 1.
Figure 5:
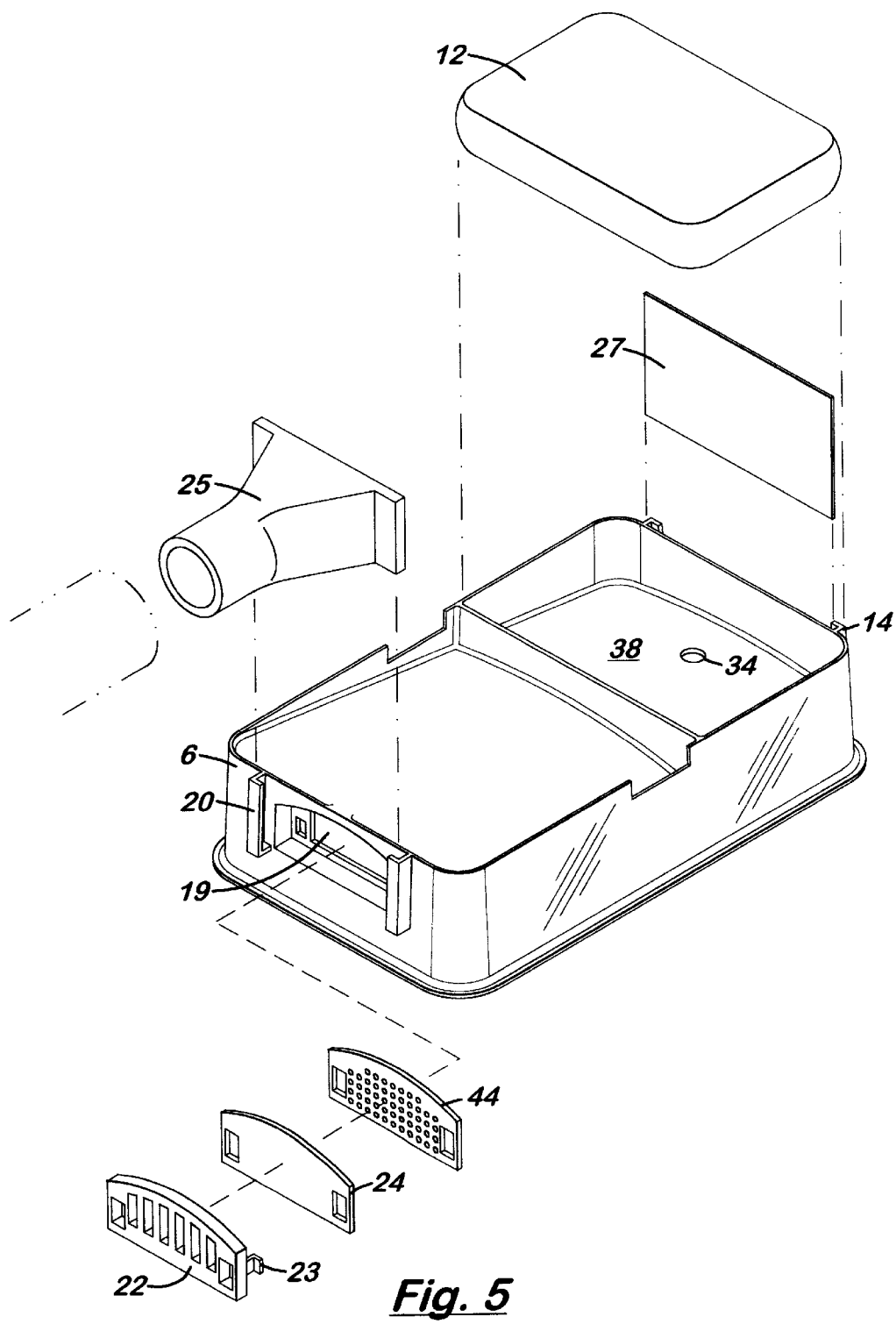
FIG. 5 is a perspective exploded view of the cage top.
Figure 6:
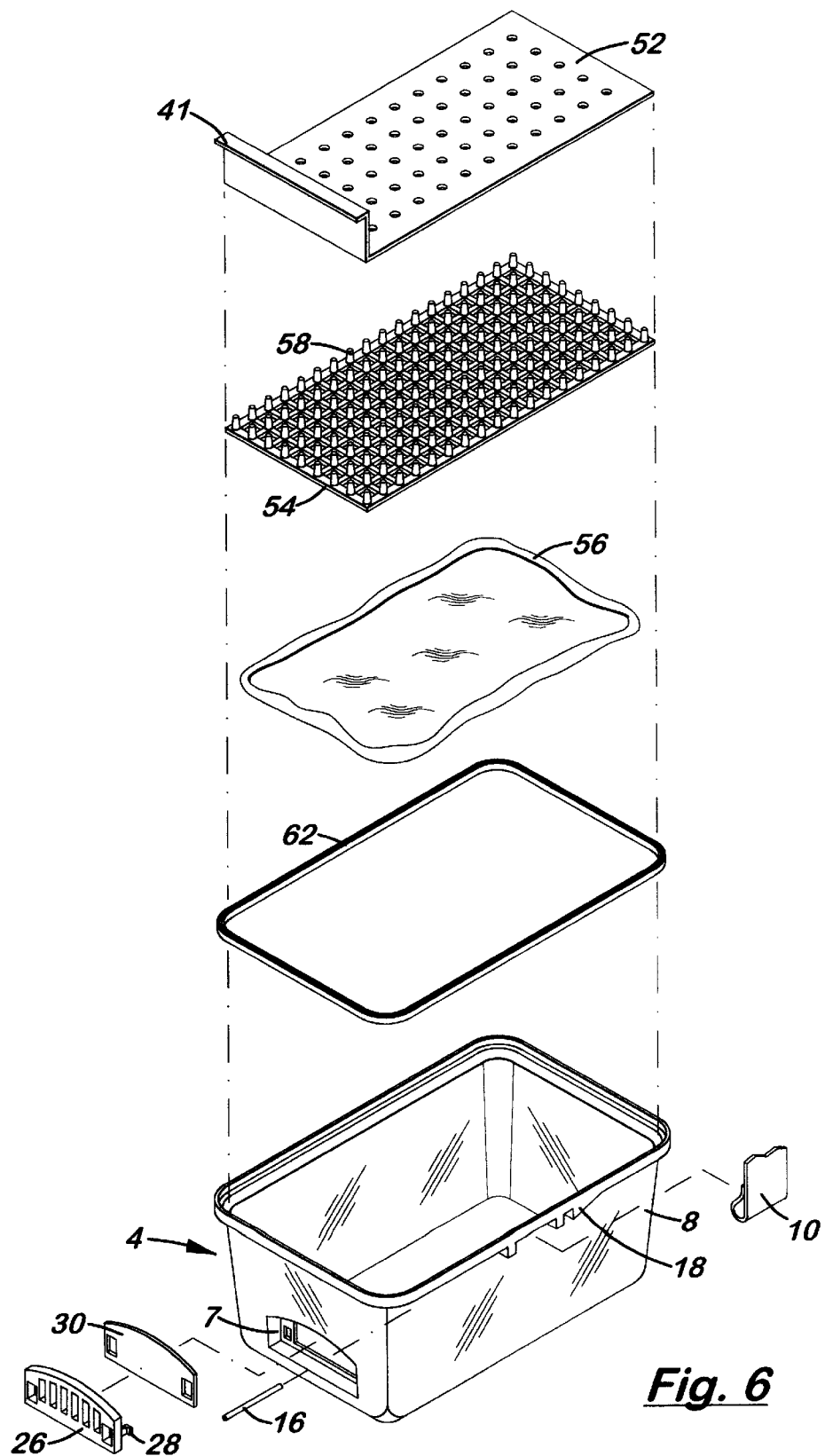
FIG. 6 is a perspective exploded view of the cage base.

Preferably, bedding/nesting material (60) is placed on top of cage insert (52) as shown in FIG. 4 so that the resident animals can form nests, burrow and play with the materials. The bedding is formed of non-toxic polymeric materials such as nylon. Although not shown, other enrichment or play materials can be placed in the cages such as small boxes of various shapes and sizes, posts, ladders, treadmills and hammocks.

Flange (8) on base (4) protects the seal with the top (6). As shown in detail in FIG. 7, a gasket (62) is fitted over the edge of top (6) and fits snugly into the recess of flange (8) of the base. The gasket can be made of any suitable elastomeric sealing material, and can easily be made by splitting flexible tubing. FIG. 8 illustrates an alternate embodiment in which gasket (62) is applied over a straight edge of base (4) and the gasket is covered by a flange (8) on the top (6).

Figure 20:
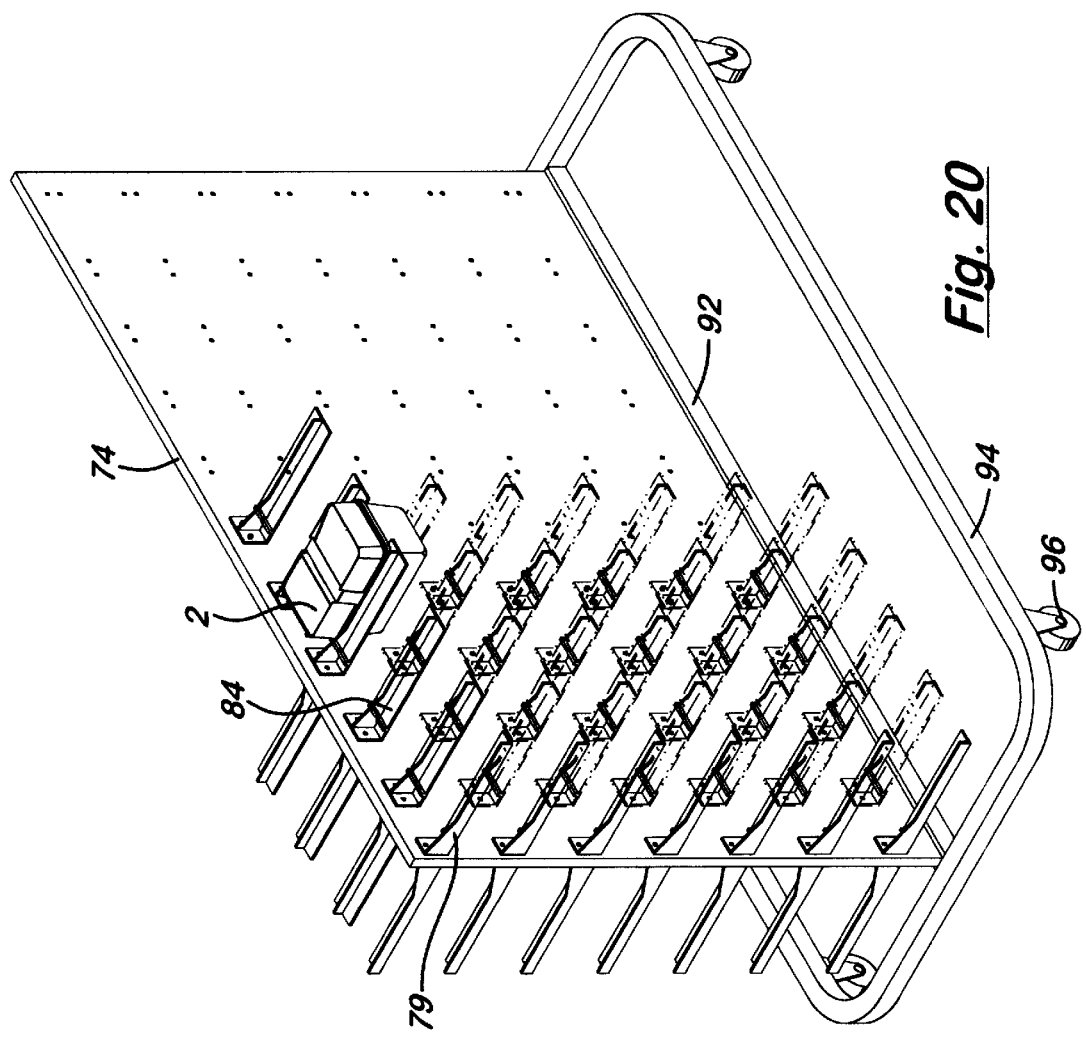
FIG. 20 is a top perspective view of the cage support structure.

The cages of the invention can be used individually for isolation, containment and/or transport of a variety of organisms in research, breeding, housing, storage and shipping. The sizes and proportions of the isolation containers can be selected according to the needs of the organisms and/or specimens. Where significant numbers of laboratory animals are to be maintained, the cages are preferably integrated into a cage rack system such as illustrated in FIG. 20, with multiple cages mounted on supports (70) or (84) on at least one side of a vertical support wall (74). Suitable lighting, controlled by a timer, can be incorporated in the wall (not shown here). The cages are arranged with the front (intake) ends outward, so that the exhaust air flowing from the other ends tends to flow vertically upward along the support wall. Exhaust nozzles (25) (not shown here) can be attached to an exhaust duct system leading directly to the room, building HVAC system, or outside. Any suitable means of such mounting of the cages in vertical arrays can be used, but preferred shelfless support systems are illustrated in FIGS. 14 to 19. These support systems are simpler than shelves, provide better visibility of the resident animals, and by providing more uniform environmental conditions in the cages, result in less variability of the lab animals.

The end cage support bracket (70) of FIG. 14 is fastened to support wall (74) by bolting flange (75) to the support wall with screws or bolts (72) or other suitable fasteners. The support wall is preferably made of stainless steel or similar inert, nonporous material. The bracket has a vertical member (73) and a horizontal member (71) which serve to support the outer corner edge of the cage at the end of a row, and stop (76) which positions the cage laterally along the bracket. Such end brackets are used at each end of all rows of cages. Latchpiece (78) is swivel-mounted by screw (82) or other suitable swivel means. Handle (80) is provided for user convenience, and a similar piece, latch stop (81), inside the latchpiece limits the travel of the latchpiece beyond the horizontal or vertical positions.

FIG. 15 illustrates middle brackets (84) which simultaneously support two cages, being used to support all but the endmost cages in each row. The brackets are fastened to support wall (74) by flanges (75) with screws (72). The brackets have vertical member (73) and horizontal members (71) which support the corner edges of the two adjacent cages in each row. Stops (76) are provided on each horizontal member to position the cages. Latchpiece (86) is mounted by swivel screw (82) and spring (83). Spring (83) fits inside the hole in the latchpiece, with screw (82) passing inside the coil spring. The latchpiece is thus maintained in any set position by the tension of the spring, which can be overcome by slight pressure when the latchpiece is to be rotated. The outer edges of latchpiece (86) are bent outward to provide convenient handles for the attendant.

FIGS. 16 and 17 illustrate alternative means of mounting the end and middle support brackets to support wall (74) by employing hooks or tabs (88) which fit into spaced slots (90) in the support wall (74). The slots could also be included in vertical support pieces (not shown) which are fastened to the support wall. Such slotted vertical support pieces and hooked shelf brackets are commercially available.

FIGS. 18 and 19 illustrate the operation of the swiveling latchpieces on the middle and end brackets, respectively. When latchpiece (86) is positioned horizontally on middle bracket (84), it prevents the two adjacent cages which are partially supported by that bracket from being slid out of position. When the latchpiece is swiveled to the vertical position as shown at (79), either or both cages can be removed, provided that the latchpieces on the other sides of the two cages are also swiveled to the vertical position. Similarly, when latchpiece (70) of the end bracket is positioned horizontally, the cage is retained in position, but when swiveled to the vertical position as shown at (77), the cage can be removed, provided that the latchpiece on the middle bracket on the other side of the cage is also placed in the vertical position.

FIG. 20 illustrates one cage (2) of a bank mounted on two middle brackets (84). The cage can be mounted between the two middle brackets and supported by the flanges on the cage base. Support wall (74) is supported by beam (92) or other suitable means, and the beam is supported by frame (94) which is shaped to prevent the cages from contacting adjacent walls of the room. All rack components are designed to be free of sharp edges or projections, with minimum ledges, angles, corners and overlapping surfaces to minimize the accumulation of dirt, debris and moisture. This facilitates effective cleaning and disinfecting, providing safe working conditions. Preferably the rack system includes caster wheels (96) to facilitate moving and positioning. At least two of the caster wheels should have brakes (not shown).

This unique shelf-less cage support design reduces experimental variability between animals and improves their visibility in the cages. Accessibility of the cages, illumination in the cages and the ventilation system are also all improved. The shelf-less configuration prevents the accumulation of moisture and heat loads under shelves, while promoting upward air currents and air stratification against the smooth surface of the support wall. The simple cage-lock system ensures exact placement of each cage on its support brackets at optimal distance from the support wall.

Due to the natural upward convection flow of air created in the cages by the heat generated by the resident animals, mechanical ventilation is not required for the cages of the invention, whether maintained individually or in banks as described above. Attaching exhaust nozzles (25) to the exhaust vents can improve the laminar flow of air. Such exhaust nozzles can be any shape suitable to channel air from the rectangular exhaust port to a round outlet or connection. Preferably, the nozzle is shaped or "tuned" to provide unobstructed laminar flow from the exhaust port. If required, the exhaust nozzles of cages maintained on the shelfless rack systems described above can be connected to a mechanical exhaust ventilation system incorporated into the support wall (not shown here). Such an exhaust system is illustrated in advertising for the GENTLEAIR (™) ventilated rack system produced by Alternative Design Manufacturing & Supply, Inc. of Siloam Springs, Ark., which is incorporated herein by reference.

Figure 21:
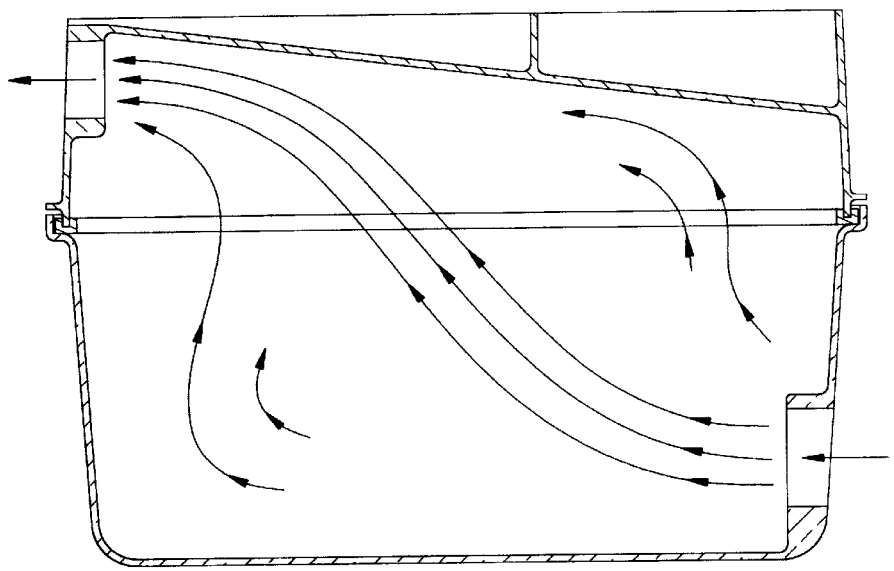
FIG. 21 is a diagrammatic view of the laminar air flow through the cage of FIG. 1, without accessory obstructions.

The advantages of the invention are illustrated by FIG. 21, which shows a computer-simulated laminar convection flow of air (A) from intake to exhaust ports in a cage (2) not containing a feeder structure. This two-dimensional longitudinal cross-section analysis of a mouse cage of appropriate height represents the worst case scenario when five mice (not shown) are located near the air inlet. The airflow through the cage is driven by the thermal currents generated by the mice. There is some turbulence created, but the airflow remains appropriately laminar. If the animals are located at other sites such as in the middle when they are eating or at the opposite (exhaust) end when they are exercising or sleeping, the air flow becomes uniformly laminar across the cage. The airflow is driven upward and toward the exhaust because of the upward thermal air currents from the animals and the sloping dome-shaped ceiling of the cage. Computational modeling indicates that refill rates of 15 times per hour can be accomplished with 1.5 square inches of filter material at each end, with a resistance of 0.5 inch of water at 360 cubic feet per minute per square foot.

Figure 22:
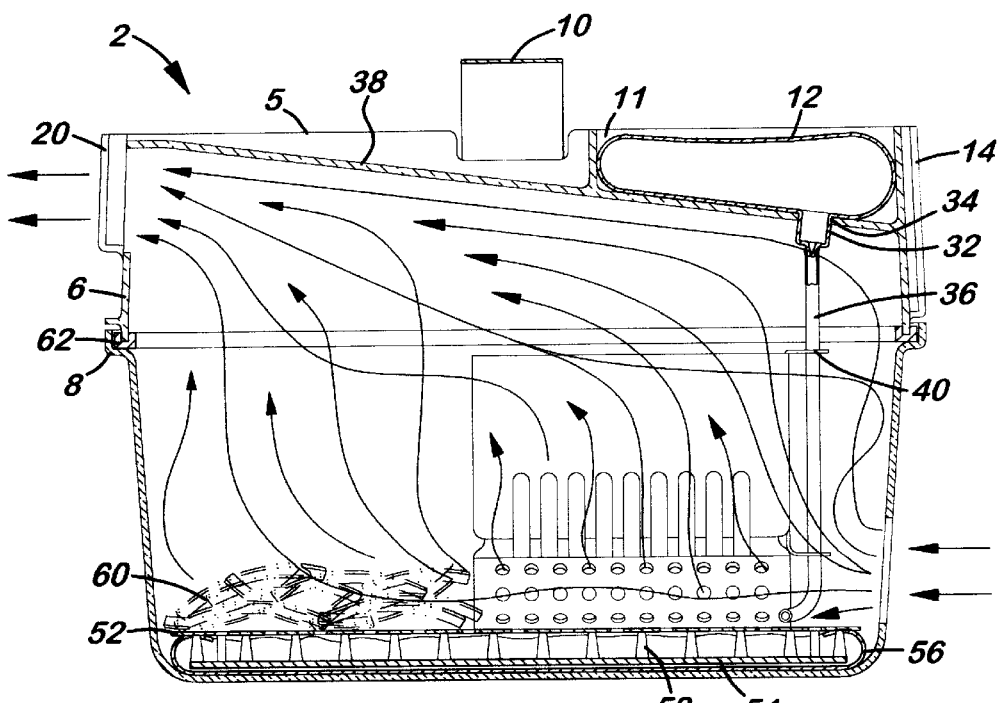
FIG. 22 is a diagrammatic view of the laminar air flow through the cage of FIG. 1 containing a feeder assembly.

FIG. 22 illustrates the laminar convection flow of air (A) through the cage (2) containing the feeder, other accessories and resident mice. The mice (not shown) are located near the feeder in the middle of the cage. It can be seen that the support tubes for the feeder help to increase air flow across the floor of the cage. No drafts appear to result from the presence of the feeder structure.

Figure 23:
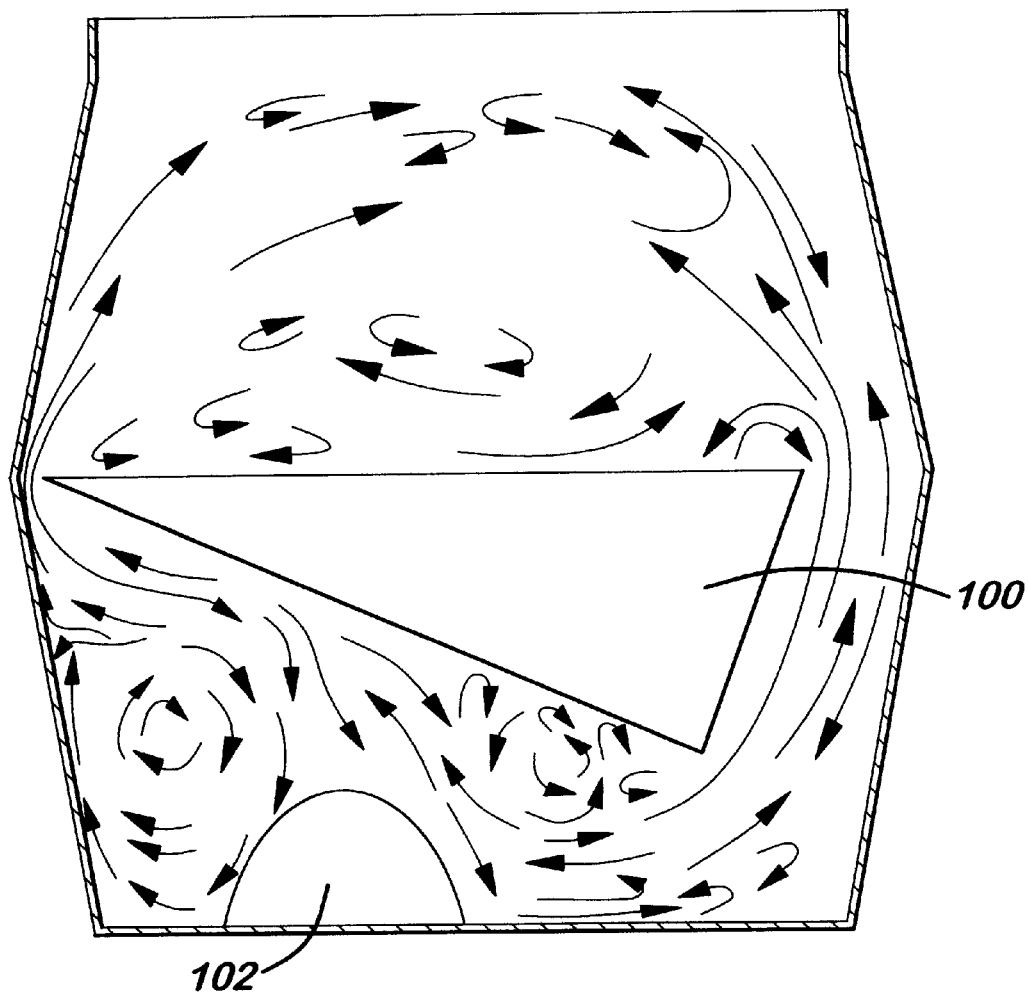
FIG. 23 is a diagrammatic view of turbulent air flow through a prior art microisolation cage with a filter top only.

In contrast, FIG. 23 is a similar computer-modeled airflow for a mouse cage (95) of a similar size, but having the "Petri dish" form and having only filter material at the top (97). A group of mice (102) is huddled under feed rack (100). It can be seen that considerable turbulent convection flow results, as shown by (B), with dead air areas (C) which will tend to produce unhealthy conditions for the animals. The only air intake is from the filter top, and there is no real air exchange with the outside. Notably, there is no escape of air except around the lid (97), which is rather inefficient. The model shown is for a free-standing box; the air circulation pattern for such boxes arranged in typical banks on shelves would be much worse.

Figure 24:
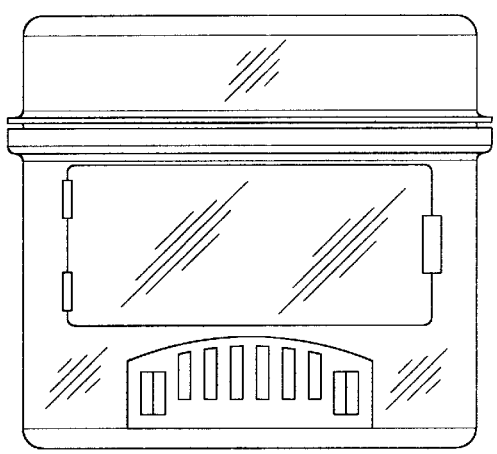
FIG. 24 is a side elevation view of an embodiment of the cage having a door in the front end above the intake filter.
Figure 25:
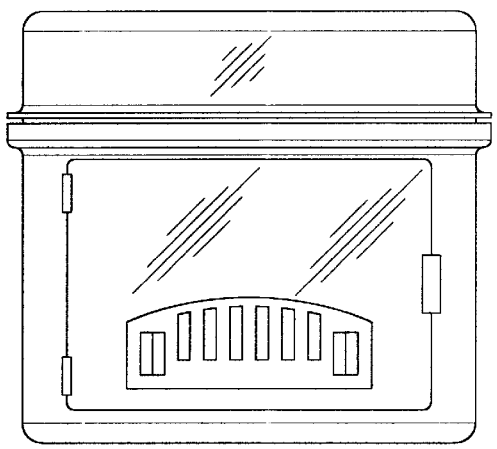
FIG. 25 is a side elevation view of an embodiment of the cage having a door in the front end which includes the intake filter.
Figure 26:
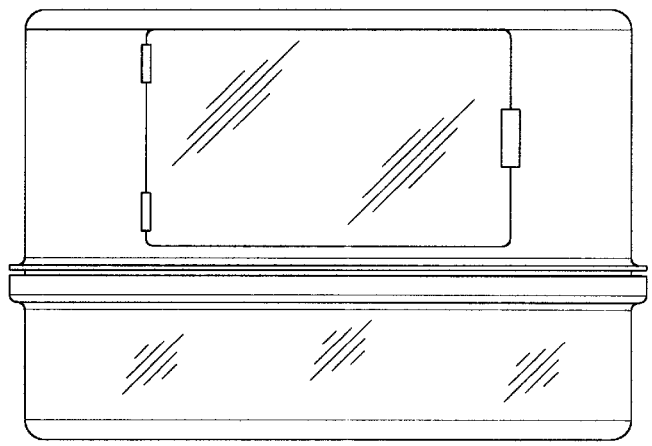
FIG. 26 is a side elevation view of an embodiment of the cage having a door in the side of the cage top.

For small rodent cages, the presently preferred configuration includes a base and removable top with intake and exhaust ports located at the bottom and top of the cage, respectively, and on opposite ends. The animals can be inserted or removed by removing the top of the cage. For larger laboratory animals, alternate means of access and egress would be considered. For example, FIG. 24 shows an end view of a cage (200) with an access door (202) included in the base (206) above the intake port (208), and FIG. 25 shows an end view of a similar cage (210) in which the access door (212) includes the intake port (214). FIG. 26 is a side view of a cage (220) in which an access door (222) is included in the side of the top (224). If desired, larger cages can use a one-piece construction, with intake and exhaust ports at either end and an access door occupying a substantial portion of the side of the cage (not shown).

Figure 27:
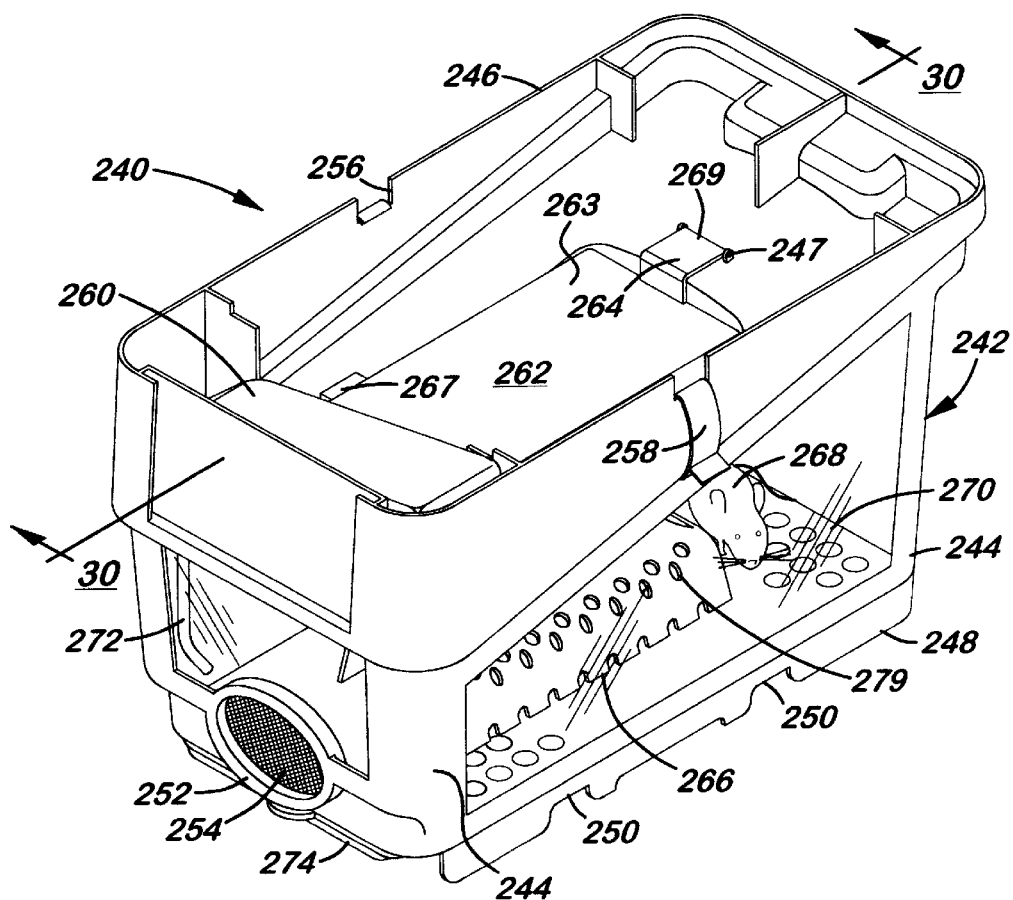
FIG. 27 is a top perspective view of an assembled cage in an alternate embodiment.
Figure 28:
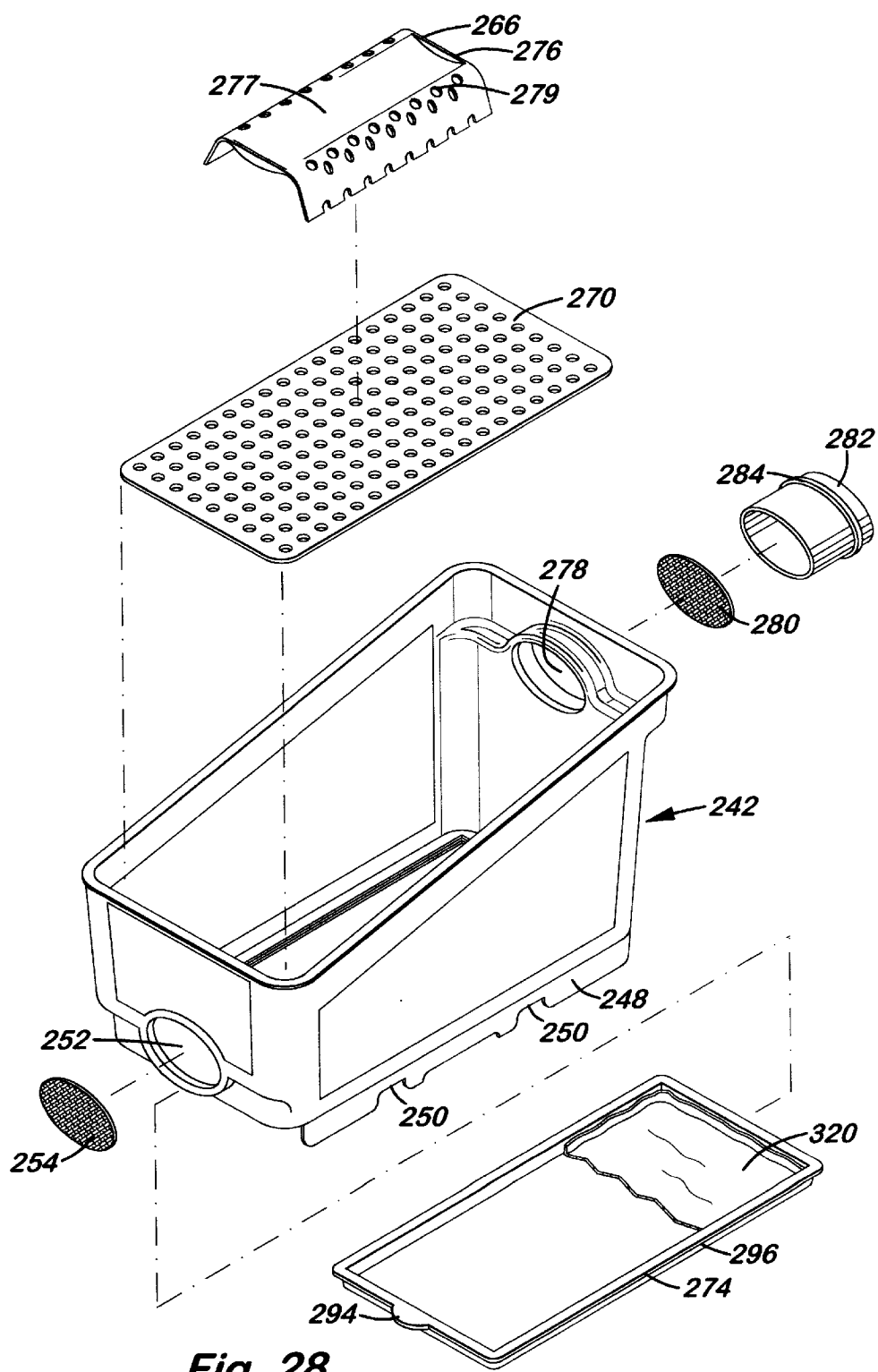
FIG. 28 is a top perspective exploded view of the base portion of the cage of FIG. 27.
Figure 29:
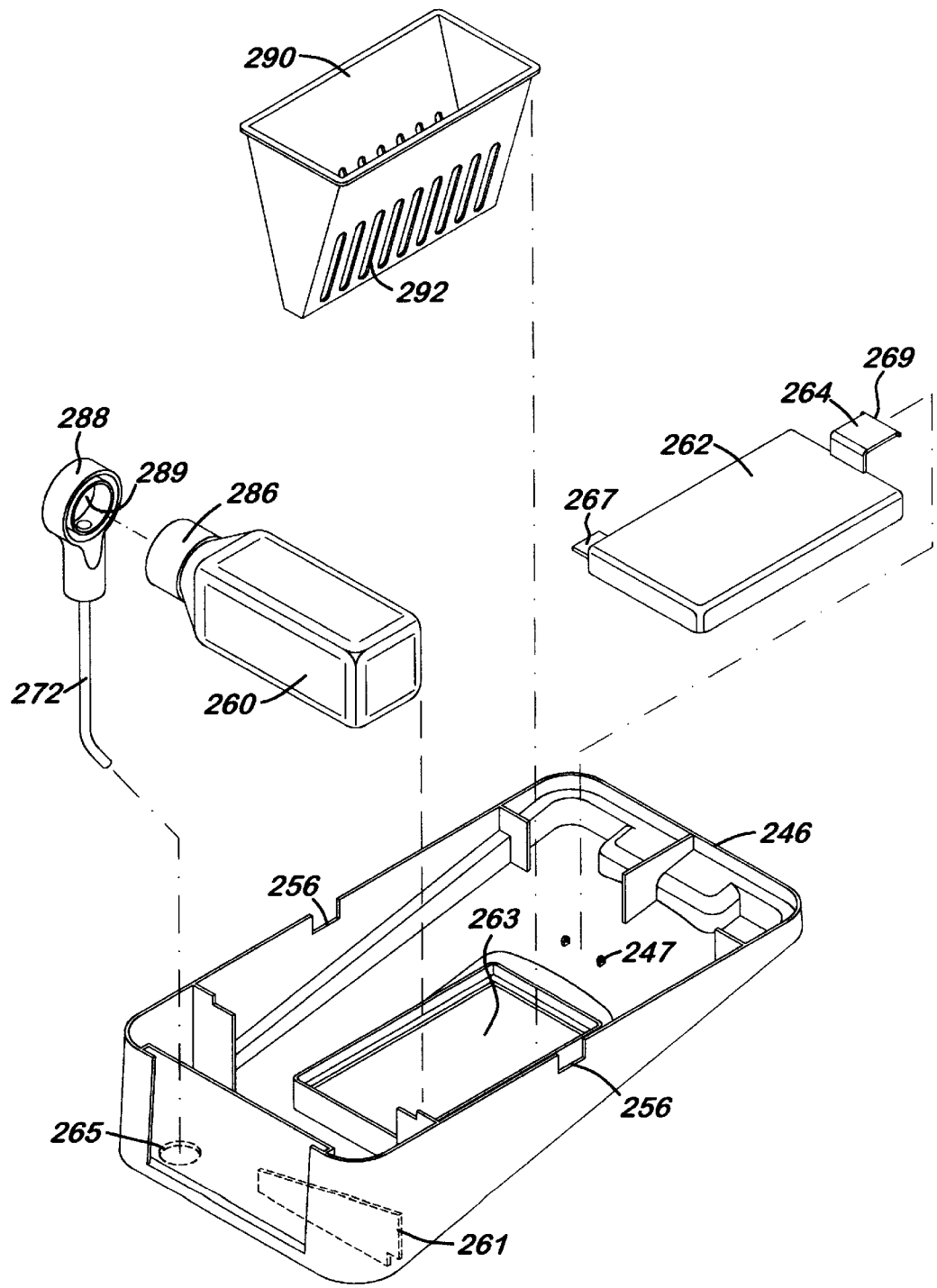
FIG. 29 is a top perspective view of the top of the cage of FIG. 27.

Turning now to additional FIGS. 27 to 33 which illustrate improved or alternative embodiments of the present invention, FIGS. 27 to 29 illustrate certain features of an alternate embodiment of the cage of the invention. The assembled cage 240 includes a base portion 242 which is made primarily of a transparent material such as a polycarbonate plastic. Optionally, corner and edge portions such as 244 can be made of thicker portions of the same material for strength, with the result that these portions are translucent rather than transparent. Intake port 252 is preferably fitted with a filter or screen 254. A sliding waste tray 274 is fitted under the bottom of the base portion 242 to catch waste passing through the perforations in the perforated cage insert 270, which is retained in place by suitable mechanical means (not shown here). Notches 250 are cut into the bottom edge 248 of base portion 242 to retain the cage upon shelfless supports, discussed below.

The cage is shown as occupied by one mouse 268. Sipper tube 272 is visible through the front wall of the cage. Perforated support 266 is also visible, and takes the form of an inverted half tube with a shallow depression at the top where the V-shaped feeder rests, allowing this surface to serve as a feed tray. Perforations 279 are provided in support 266 for visibility and ventilation, and support 266 preferably is made of non-toxic material such as nylon or stainless steel. Top 246 is sealingly attached to the base portion and secured with a clip 258 resting in notches 256 in the top edge of the top 246. The top and base are preferably designed so that they join to form an air-tight seal. The underside of the top 246 forms a sloping domed ceiling (not visible here) which slopes upward from the front (intake) end to the rear (exhaust) end, as in the embodiment described and illustrated above.

Water bottle 260 is visible in FIG. 27, and illustrated in detail in FIG. 29. Neck 286 is inserted into aperture 289 of resilient fixture 288, allowing water to run into sipper tube 272. The bottle can be any suitable container which can be fitted into the allowed space on the top, but is preferably a standard commercial bottle such as an "Odwalla" juice bottle, marketed in 4 oz., 8 oz. and 16 oz. sizes, for convenience and economy. Feeder lid 262 covers a space for a drop-in portion of the feeder structure. It is hinged by pin 269 to connections 247, with hinge plate 264 connecting to lid 262. Tab 267 can be used for lifting the lid by finger or hand tools. V-shaped feeder rack 290 has slots 292 to allow food access to the occupants, and is similar to the structure described-above. V-shaped feeder 290 is inserted through opening 263 when lid 262 is raised, and rests upon the upper surface 277 of perforated support 266. Perforated support 266 is solid and recessed on the top, except for sills 276 which close off both ends to form a shallow depression or tub-like area 277. This area serves not only to support the V-shaped rack but to hold powdered feed, feed fragments, or even liquid or viscous feed.

Sliding waste tray 274 is retained in place below perforated cage insert 270 by lip 296, and can be removed using tab 294. Cage floor insert 270 is retained in the cage base by rim 298. Exhaust port 278 is preferably fitted with a screen or filter 280, and optionally with an exhaust nozzle 282, which is retained in place by rim 284. As discussed above, exhaust nozzle 282 can be used as is, or connected to manifold means to direct exhausted air to another area or a ventilation system. Both the intake and exhaust ports in this embodiment are oval, or could be round.

Figure 30:
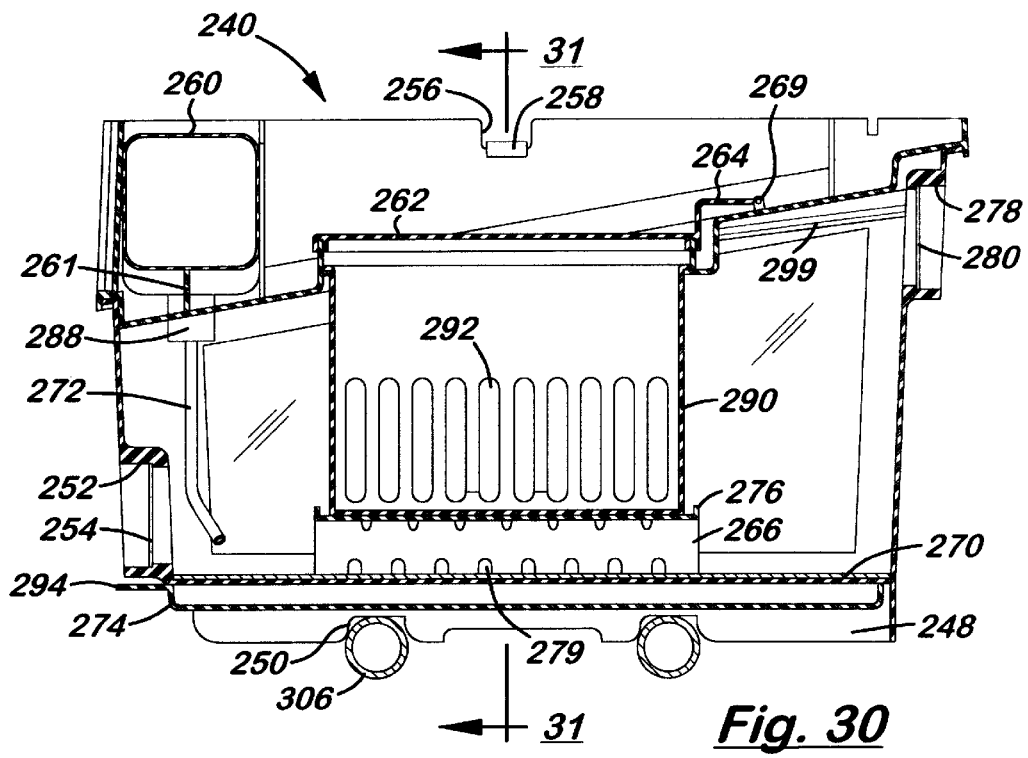
FIG. 30 is a longitudinal cross sectional view of the cage of FIG. 27.
Figure 31:
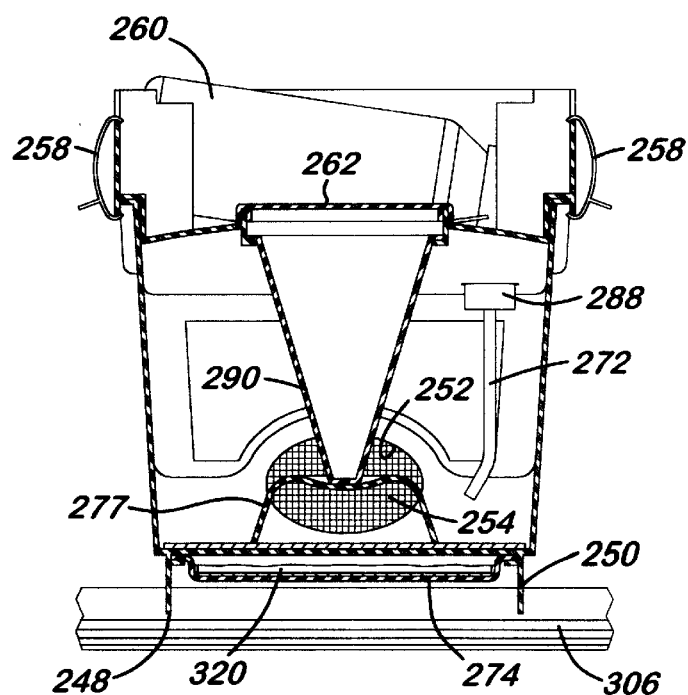
FIG. 31 is a lateral cross sectional view of the cage of FIG. 27.

The features discussed above are shown in further detail in sectional views 30 and 31, particularly portions of the feeder and water delivery systems. For example, FIGS. 30 and 31 show depression 277 and sill 276 more clearly. The sloping domed ceiling 299 of the cage is shown in FIG. 30. Absorbent material 320 is placed in waste tray 274 to handle waste, as discussed above for the first embodiment. The cages are supported in position by support bars 306, part of the shelfless rack. The other features shown in FIGS. 30 and 31 are described above with reference to the same numerals in FIGS. 27–29.

Figure 32:
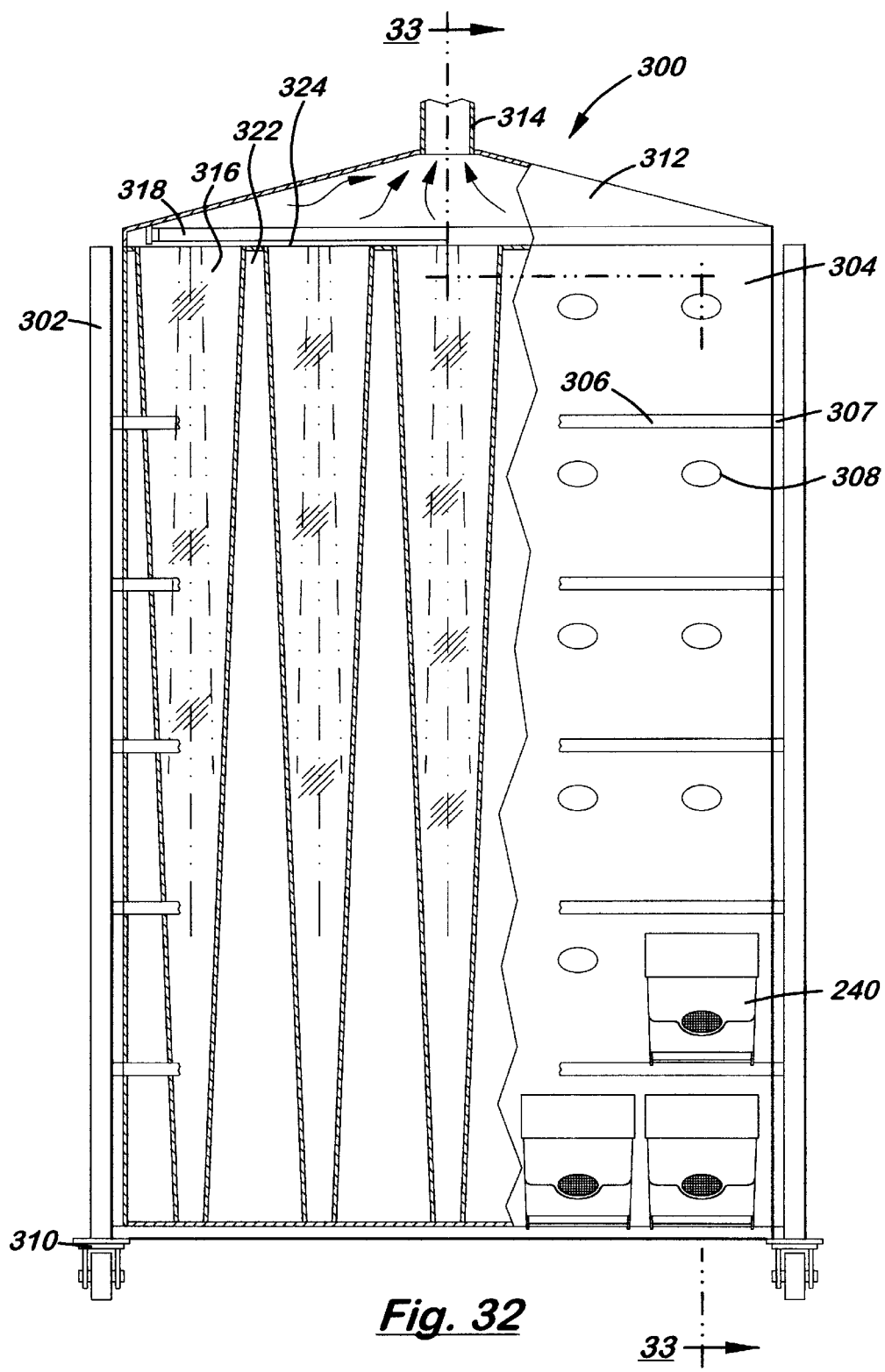
FIG. 32 is a front view of an array of cages mounted upon a cage support system of the invention.
Figure 33:
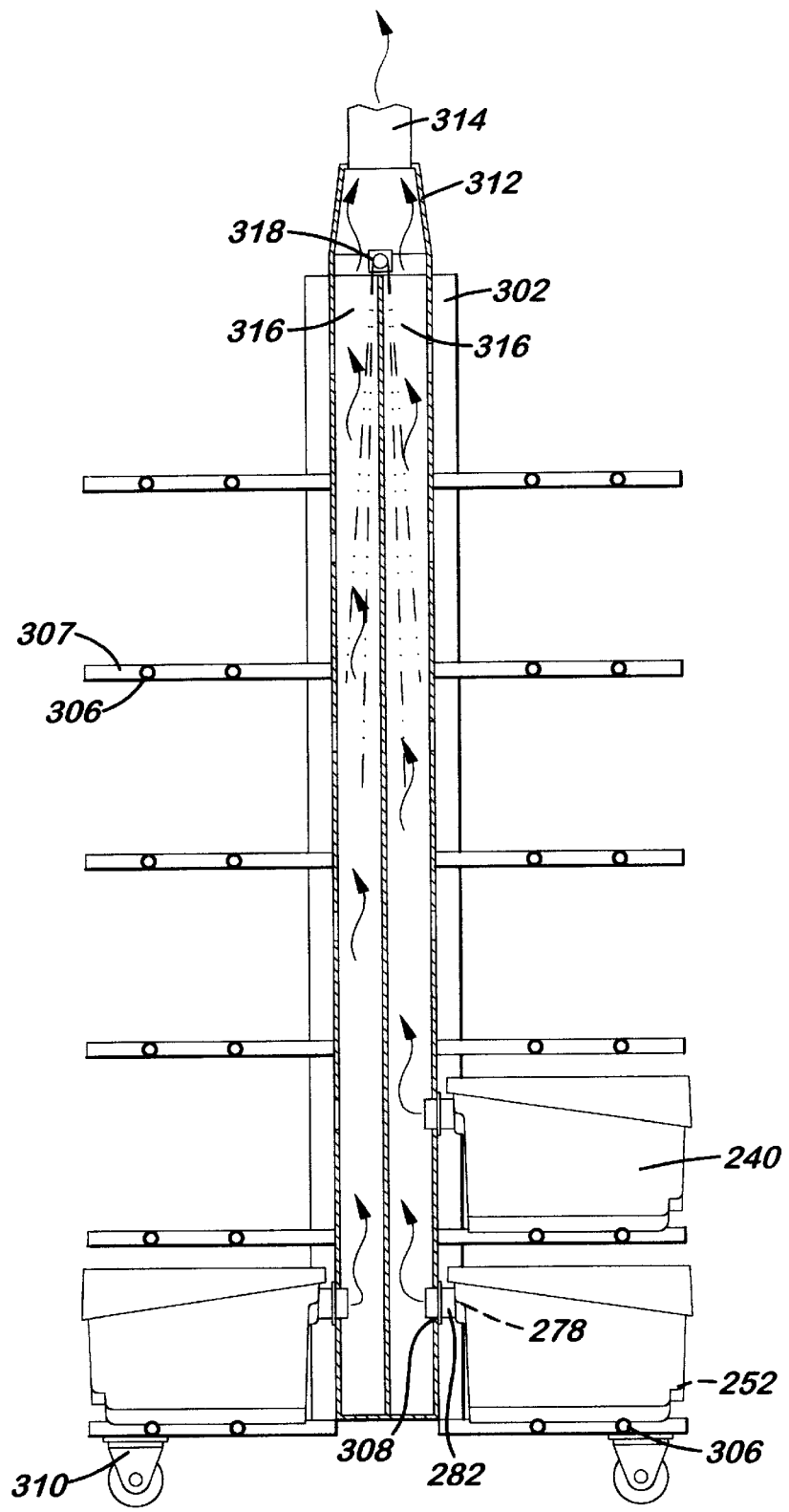
FIG. 33 is a cross sectional side view of the cage array and support system of FIG. 32.

FIGS. 32 and 33 illustrate an array of cages 240 in place on cage rack 300. The rack includes uprights 302, vertical support wall 304, lateral supports 307 and horizontal support bars 306, which physically support the cages. It can be seen that this provides a shelfless rack system equivalent to that described above for the first embodiment. Support wall 302 forms a space in which an exhaust chimney 316 is provided for each vertical array of cages. Exhaust chimneys 316 can take up half the thickness of support wall 304 as shown in FIG. 33, or can extend to the full thickness of the wall. Exhaust chimneys 316 are formed to have a wider cross section at the top than at the bottom to aid convective air flow of the exhaust, and are separated by voids 322. The exhaust nozzles 282 of cages 240 are attached to exhaust connections 308, thus entering exhaust chimneys 316. Thus, when the cages are in place, air enters the intake ports at the exposed (front) ends of the cages, passes through the cages in laminar convective flow, and is exhausted through the exhaust ports 278 and exhaust nozzles 282 into exhaust chimney 316. The exhausted air rises upward (as indicated by arrows) due to its elevated temperature and convective effects, is gathered by manifold 312 and passes into exhaust stack 314. As discussed above, this exhaust can simply be directed to the outside air or can be connected to a mechanical exhaust or ventilation system. As described above, wheeled casters 310 are provided for mobility.

At the top of support wall 304 where it joins manifold 312, a lamp 318 is installed to provide light to the cages when desired. Any suitable fluorescent or incandescent lamp can be used, including full spectrum lamps which simulate sunlight. The light is transmitted down the exhaust chimneys 316 via their mirrored interior surfaces 324, and enters the cages via the exhaust nozzles 282 and exhaust ports 278. The reflective surface of domed ceiling 299 facilitates the flow of gases.

Selection and Manufacture of Filter Media

Depending upon the needs of the animals and the characteristics of the environment, a wide variety of filter media can be used in the intake and exhaust ports of the cages. Preferably, the filter media will exclude contaminants larger than about one micron, more preferably contaminants larger than about 0.5 micron, and most preferably, contaminants larger than about 0.1 micron. In most cases, the filter media will be ordinary mechanical filters. Flat or panel mechanical filters generally consist either of a low packing density of coarse glass fibers, animal hair, vegetable fibers or synthetic fibers, often coated with a viscous substance (e.g., oil) to act as an adhesive for particulate material, or even slit and expanded aluminum. Flat filters can efficiently collect large particles, but remove only a small percentage of the smaller particles which are respirable by humans. Flat filters may also be made of "electric" media, consisting of a permanently-charged plastic film or fiber. Particles in the air are attracted to the charged material.

Pleated or extended surface filters generally attain greater efficiency for capture of respirable size particles than flat filters. Their greater surface area allows the use of smaller fibers and an increase in packing density of the filter without a large drop in air flow rate. (In each case, there are tradeoffs between filtering efficiency and air flow to be considered.) High Efficiency Particulate Air (HEPA) filters can be used, and are described below. The intake and exhaust filters will of course be changed periodically, according to conditions.

Preferably, the filter medium is a gas-permeable filter membrane capable of capturing all particles above a certain minimum size (e.g., one micron) while allowing air and other gases to pass freely. Suitable membranes can be prepared, e.g., as disclosed in U.S. Pat. No. 5,190,879, which is incorporated herein in its entirety by reference. The 0.1 micrometer to 0.3 micrometer grade of material presents an effective barrier to microbes and particulate matter, with titer reductions at an efficiency of ten million.

Other suitable membranes include the flexible air permeable non-woven fabric filters of U.S. Pat. No. 4,540,625 (expired) and the filter material comprising porous apatite particles embedded in water soluble glucan of U.S. Pat. No. 5,143,752. Both of these patents are incorporated herein by reference in their entirety. Suitable filter membranes are available commercially, e.g., from DuPont and Pall Filtration.

Preferably the membranes are ultra-thin dense composite membranes comprising non-woven materials, which can be sterilized by exposure to gamma radiation, ethylene oxide or autoclaving. The membrane creates a passive barrier to the movement of airborne contaminants into or out of the cage, while permitting the exchange of respiratory and toxic gases, carbon dioxide, ammonia, sulfuric waste by-products, microbes as small as 0.1 micron in size and allergens.

The strategically placed intake and exhaust ports in the cages of the invention ensure high intracage airflow rates. The room-coupled static environmental closed system with improved air exchange is equipped with an exhaust port in the upper portion of the dome-shaped sloping top. The filter membrane therein effectively extracts cage effluent through the low resistance membrane filtration system before the air re-enters the animal room. The membrane-filtration system in the base of the cage is exposed to cool room air to optimize passive air diffusion into the cage. Typically, in an animal room set at 66 deg. F., 50 percent relative humidity and fifteen air changes per hour, five mice in a cage would generate 2.0265 Kcal/hr of heat, 0.5 g/hr of moisture, 0.76 g/hr of carbon dioxide and 0.0016 g/hr of ammonia. With relatively low air diffusion in the cage, the animals' thermal load and production of moisture and gases produces upward movement of air and vapors, creating pressure differentials between the inside and outside of the cage toward the filtered passive exhaust system. The caging system thus maximizes cage ventilation while minimizing the accumulation of heat and moisture and eliminating the buildup of ammonia and other contaminants. More importantly, it provides "good air quality" for both animals and workers. Good air quality can be defined as the absence of any substance in the air which is a health hazard or source of discomfort to the animals or a threat to occupational health. Some common pollutants include aldehydes, volatile organic compounds, sulfur compounds, ammonia, carbon dioxide, carbon monoxide, metabolic by-products, excessive moisture, dirt particles and allergens.

The natural convection created by the body heat of the animals in the closed-system isolation enclosure drives the low velocity air filtration. The use of laminar convection flow to ventilate the microenvironment through the filter membranes serves to eliminate the buildup of harmful gases and provide good air quality within the enclosure.

The particle retention of filter membranes in air is very efficient. In air filtration, retention of particles is mostly by direct interception (mechanical capture of a particle by the filter) by the filter matrix, but there are four additional factors which can cause particles to be captured by the filter. These include: 1) inertial impaction (the particles's inertia carries it in a straight line even when the airstream bends), 2) gravitational settling (gravitational forces may affect particles in an air stream), 3) electrostatic attraction (electrical forces create charge differences between the filter and the particle, resulting in particle capture, and 4) Brownian motion (very small particles exhibit the erratic movements of Brownian motion). Because of their irregular flow paths, such particles are more likely to be captured by the filter.

Various methods can be used to test filters. The "weight arrestance" test, described in the American Society of Heating, Refrigeration and Air Conditioning (ASHRAE) Standard 52-76, is generally used to evaluate low efficiency filters, designed to remove the largest and heaviest particles. Such filters are commonly used in residential furnaces and the like. For the test, a standard synthetic dust is fed into the air cleaner and the proportion (by weight) of the dust trapped on the filter is determined. Because the particles in the standard dust are relatively large, the weight arrestance test is of limited value in assessing the removal of smaller, respirable-size particles from indoor air.

The "atmospheric dust spot test", also described in ASHRAE Standard 52-76, is usually used to rate medium efficiency air cleaners (both filters and electronic air cleaners). The removal rate is based on the cleaner's ability to reduce soiling of a clean paper target, an ability dependent on the cleaner removing very fine particles from the air.

Military Standard 282(3) [i.e., the percentage removal of 0.3 micrometer particles of dioctylphthalate (DOP)] is used to rate high efficiency air filters, those with efficiencies above about 98 percent. High efficiency particulate air (HEPA) filters are commonly encountered in the marketplace, and are a subset of high efficiency filters. They are typically rated using the DOP method. One standard-setting organization defines a HEPA filter as having a minimum particle collection efficiency of 99.97 percent by this testing method.

EXAMPLES

The invention will be further illustrated by the following non-limiting examples.

Computational Fluid Dynamics: Applicant recognized that a comprehensive study of air movement, heat transfer, and contamination dispersal in the microenvironment of an animal cage could only be undertaken using computational fluid dynamics (CFD). CFD is a three-dimensional mathematical technique of numerical algorithms used to compute the motion of air, water, or any other gas or liquid. Applicant used computer modeling software (NISA/2D and FLUENT/3D) to optimize the cage design and geometric parameters of a closed-system. CFD uses five Navier-Stokes equations for viscous fluid flows. They are energy, three momentums, and mass conservation equations. The source (variable quantity, e.g. source of heat) solved transient (variable variation with time) plus convection (variable transportation by motion of fluid) minus diffusion (variable spread by gradient). Grid cells for which individual calculations are made, consist of the boundary (plane applied to the governing equations) under study. CFD would agree to simulate different configurations knowing that all conditions, except those being varied, remain constant (Memarzadeh, 1998). This makes comparisons of CFD simulations actually much more reliable than comparisons of experimental studies, for which there are variables. Inputs for the CFD, such as heat dissipation at 2.3 watts, surface temperature at 30° C., moisture at 0.5 g. $H_2O$ per hr., $CO_2$ at 0.76 g. per hr. ppm, and $NH_3$ at 0.0016 g. per hr. generation rates for 5-mice model, were defined by a set of experimental measurements in a wind tunnel (Riskowski et al., 1996).

Then, applicant created computer simulations and analyzed the ventilation performance of different cage designs by computational fluid dynamics. Agreement with prior CFD analysis was maintained by using computer software modeling NISA/2D analysis (Engineering Mechanics Research Corp., Groton, Conn.) when comparing static microisolator cages with filter tops and vented microisolation containers with closed tops. A series of cage configurations were developed which were examined by using NISA/3D. Applicant further optimized the cage design by importing a Pro-E (Parametric Technology, Cambridge, Mass.) furniture design into the more sophisticated computer software modeling FLUENT 4.5 (FLUENT, Inc., Lebanon, N.H.). The aim was to create a micro isolation container with adequate and filtered ventilation. The energy-efficient design for appropriate caging would lie within the animals; their metabolic heat that rises towards the top and exits a filtered vent located at the highest end of the cage, i.e. convective heat transfer. Subsequent design refinements would be based on the findings of this analysis.

Case Studies: The analysis of the flow processes in the cage falls under the rubric of convective heat transfer (Bejan, A., 1984). In this case, the driving potential for the flow is the metabolic heat generated by the mice. The metabolic heat source creates a localized buoyant flow in which the heated air rises towards the top of the cage and exits the vent located at the highest end (rear) of the cage. Conservation of mass then requires that cooler air must enter the cage through the inlet located near the bottom at the front of the cage. We may gain some insight as to the magnitude of the various effects by considering a simple steady state model of the system. A steady state model implies that the mice remain stationary and that their metabolic rates remain stationary for a duration of time sufficient for the system to reach a steady state. We may use the first law of thermodynamics to write an energy balance for this simple model in which the air speed and temperature at the inlet and exhaust are related to the metabolic heat source:

$$\dot{m}C_p(T_{exit}-T_{inlet})=\dot{Q}_{metabolic}$$

Here $\dot{m}$ is the mass flow rate of air entering and exiting the cage and $C_p$ is the specific heat of the air.

The mass flow rate is related to the air speed by the relationship $$\dot{m}=\rho v A,$$

where $\rho$ is the density of air, $v$ is the gas speed (velocity) and A is the cross sectional area of the inlet and exhaust sections of the cage. The unknown parameters in this model are the air speed and the temperature difference between the inlet and exhaust. We may gain some insight by manipulating the above equations into the form:

$$v\Delta T = \frac{\dot{Q}_{metabolic}}{\rho A C_p}$$

where $\Delta T=T_{exit}-T_{inlet}$. Inspection of this expression indicates that for fixed $\rho A C_p$ an increase in the metabolic heat source ($\dot{Q}_{metabolic}$) results in an increase in $v\Delta T$. This increase indicates that either the exit temperature increases or the air velocity increases or both increase. While this simple model does not provide a predictive capability (since we may only solve for the product of gas velocity multiplied by the temperature difference) it does provide a simple interpretation of the flow process as well as a quick check of the validity of the numerical results which follow. In order to provide a predictive capability we must solve the equations governing convective heat transfer for the air in the interior of the cage. These equations are the conservation of mass, momentum and energy and are expressed as a set of partial differential equations (Bejan, A., 1984):

$$\frac{\partial \rho}{\partial t} + \nabla \cdot (\rho \vec{v}) = 0$$

$$\frac{\partial \rho \vec{v}}{\partial t} + \nabla \cdot (\rho \vec{v}\vec{v}) = -\nabla P + \nabla \cdot T^v + \rho \vec{g}$$

$$\frac{\partial \rho \left(e+\frac{1}{2}\vec{v}\cdot\vec{v}\right)}{\partial t} + \nabla \cdot \left(\rho \vec{v}\left(e+\frac{1}{2}\vec{v}\cdot\vec{v}\right)\right) = \nabla \cdot T^v \cdot \vec{v} + \nabla \cdot P\vec{v} - \nabla \cdot \vec{q} + \rho \vec{g} \cdot \vec{v}$$

Here, $\vec{v}$ is the velocity, P is the pressure, e is the internal energy, $\vec{q}$ the heat flux and $T^v$ the viscous stress tensor and T is the temperature.

We also need constitutive equations for the internal energy, density, heat flux and viscous stress:

$$e=e(T), \rho=\rho(P,T)$$

$$\vec{q}=-k\nabla T$$

$$T^v = -\frac{2}{3}\mu\nabla \cdot \vec{v}I + \mu(\nabla\vec{v}+(\nabla\vec{v})^T)$$

The equations represent severe mathematical difficulties and generally must be solved using computational techniques. The simulation results presented in this application were obtained using the commercial package FLUENT-UNS. The flow within the cage likely experiences turbulence, thus a turbulence model is required. The turbulence model used in this work is the Renormalization Group (RNG) k-ε model (Yakhot and Orszag, 1986). In addition, we model the buoyancy effect by incorporating the Boussinesq approximation (Bejan, A., 1984). Solution of the above set of equations and approximations provides a detailed picture of all of the flow variables (pressure, temperature, velocity) for the air in the cage. We again consider the cage to be in a steady state condition.

Recent advances in solid modelling technology enable the analyst to easily create computational meshes that embody the important geometric characteristics of a given physical situation. The solid model in this work represents the volume occupied by the air and the model was created and meshed with the commercial solid modeling software package Pro-E (Parametric Technology, Cambridge, Mass.) Simulation results are presented for seven cases described below, using computational grids made up of 115,210 tetrahedral cells with 23,340 nodes at the corners of the cells. The meshed model is imported into FLUENT-UNS for analysis. The heat source modeling the mice is placed under the feeder, below the inlet and below the exhaust and in the corner in these simulations. Also, examined were contours of static temperature, velocity vectors, particle traces by residence time, and entrainment of the ammonia in the flow.

Once the CFD phase was completed and final design and geometric parameters of the closed-system cage were optimized, a full-size cage prototype was constructed with dimensions of 7.25×11.5×7.2 in. Also, used was a 5-mice electric circuit model to simulate body heat loads (2.3 watts equivalent to 2.0265 Kcal/hr) from five mice in the prototype cage The cage was equipped with all the caging system furniture such as feeder, sipper tube and a waste disposal system that consists of a waste tray liner, perforated floor, and nesting material. Although no animals were housed within the cage, watering and feeding devices were maintained filled. The cage was tested in a room or wind tunnel set at 72° F. and 50 percent relative humidity in still air. Applicant performed qualitative and quantitative analyses of air distribution patterns, velocity, air change per hour, and leakage. Hot film anemometry and smoke tests were used to correlate CFD predictions and optimize airflow inlet and exhaust.

Air Velocity determination: Air velocity was measured at the inlet of the cage, using hot film anemometry. To measure inlet flow velocities of this magnitude (less than 10 cm/s) via hot film anemometer techniques it is important that the direction of both free and forced convection from the hot film be the same (i.e., vertically upward). To accommodate this a right angled downward pointing adapter with a circular inlet was placed over the cage inlet. The hot film was placed at the center of the adapter tube entrance. The velocity at the cage inlet was calculated from the measured velocity at the adapter's entrance and the tube/cage inlet area ratio of 83 percent. The hot film was calibrated via a vertically orientated laminar flow tube (with a parabolic velocity profile) and a massflow controller to regulate the air flow. Air flow velocities were measured at the inlet for several inlet/outlet filter types via hot film anemometry. Attempts to measure the exhaust flow rate via soap bubble techniques were performed. Another technique used high speed video recordings of smoke flowing at the exhaust against a background grid in the plane of light. The smoke was introduced directly in the occupied cage by dropping smoke matches at the inlet. The cage was occupied by five outbred mice weighing 24 grams on average. Intracage air velocity was estimated by smoke observation.

ACH rate determination: Intracage air exchange rates were established by determining the velocity (U), area (A), flow rate (Q), and volume (V). The total volume of air delivered via a 6 watt Argon laser, a fiber optic cable, focusing lenses and a light sheet producing cylindrical lens. The removable top of the mouse cage was replaced with a glass plate for the visual tests. The light sheet was projected vertically down through this glass plate, illuminating only a slice of the cage's volume from the inlet to the outlet. Video tapes recorded the flow field in the illuminated slice. Leakage rate determination: Air leakage from the cage was determined qualitatively by visualizing smoke escaping from the cage. Leakage was observed from the junction of the cage top and bottom and along the front of the cage. Leakage was expressed qualitatively as present or absent. In addition, leakage was visualized after intracage smoke release from a $TiCl_4$ smoke stick.

Results

CFD simulation results with and without the feeder-trough assemply in place are as follow:

Case 1—No Feeder-Trough Assembly. 5-mice model located at center of cage.
Case 2—No Feeder-Trough Assembly. 5-mice model located at center of outlet.
Case 3—No Feeder-Trough Assembly. 5-mice model located at center of inlet.
Case 4—No Feeder-Trough Assembly. 5-mice model located at corner of outlet.
Case 5—With Feeder-Trough Assembly. 5-mice model located at center of cage.
Case 6—With Feeder-Trough Assembly. 5-mice model located at center of outlet.
Case 7—With Feeder-Trough Assembly. 5-mice model located at center of inlet.
Total Gas volume in cage=$8.9\times10^{-3}$ m$^3$
Inlet Temperature=20.0 C.

| Case | 1 | 2 | 3 | 4 | 5 | 6 | 7 |
|---|---|---|---|---|---|---|---|
| $\forall$ (m$^3$) | $9.7 \times 10^{-3}$ | $9.7 \times 10^{-3}$ | $9.7 \times 10^{-3}$ | $9.7 \times 10^{-3}$ | $9.0 \times 10^{-3}$ | $8.9 \times 10^{-3}$ | $8.9 \times 10^{-3}$ |
| $T_e$ (C) | 27.45 | 26.45 | 27.70 | 27.85 | 27.65 | 25.65 | 27.45 |
| $v\left(\frac{cm}{sec}\right)$ | 12.4 | 9.9 | 11.9 | 11.1 | 11.5 | 9.6 | 12.2 |
| $\dot{\forall}\left(\frac{cm^3}{sec}\right)$ | 260 | 270 | 240 | 260 | 240 | 270 | 240 |
| ACH | 96.5 | 100.2 | 89.1 | 96.5 | 96.0 | 109.2 | 97.1 | change per hour or continuity equation solves for the following.

$$Q(cm^3/s) = U(cm/s) \times A(in^2) \times (2.54)^2 \quad ACH = \frac{3600 \times Q}{V(ml)}$$

Air Distribution: Intracage air distribution pattern was determined by visually observing smoke dispersion patterns after intracage release in the prototype. Smoke was released from a titanium tetrachloride ($TiCl_4$) smoke stick (Model 15-049, Liberty Industries, Inc., East Berlin, Conn.) inside the cage at a point on a centerline between the cage front and back, intermediate between the cage floor and the bottom of the top in the middle of the cage. Smoke was observed until it was no longer visible. Video records of air flow patterns, at the inlet, at the outlet and inside the cage, were obtained by laser light sheet illumination of smoke introduced at the inlet. The laser light sheet for illuminating the smoke was CFD simulations of contours of static temperature, velocity vectors, particle traces by residence time, and entrainment of the ammonia in the flow revealed constant airflow distribution in the cage. Computer simulation illustrated the effects of inlet and exhaust variances on the air exchange rates.

Applicant used CFD to optimize and simulate the effects of inlet and exhaust opening variances on the air exchange rates. Computer simulations demonstrated the existence of adequate air changes without drafts, metabolic contaminant buildup, or the need for mechanical ventilation while still providing effective barriers to protect the health of the animals and personnel. The environmentally-enriched cage/rack closed-system uses filtered ventilation by convection airflow to provide adequate air changes per hour without drafts, metabolic contaminant buildup, or the need of mechanical ventilation while safeguarding animal and occupational health and well being.

The CFD simulation results of contours of static temperature with the 5-mice model near the exhaust revealed a temperature gradient of 5.75° C. between the inlet and the exhaust. This is the energy necessary to induce convective heat transfer, buoyant flow and conservation of mass. The contours observed illustrated the heat rising, with the air being hotter toward the top. The feeder-trough assembly obstructs, diverts, and redistributes the airflow from the inlet such as it cools the air by 1.7° C.

The CFD simulation results of velocity vectors with the 5-mice model near the exhaust revealed airflow of 9.6 cm/s from the inlet to the exhaust. This is the result of thermodynamics: convective heat transfer, buoyant flow and conservation of mass. The observed velocity vectors illustrated the even air distribution pattern at the animal level, with the air moving sideways and toward the top. The feeder assembly obstructs and diverts the airflow from the inlet such as it is slowing and redistributing the air at the bottom of the cage, making it more comfortable at the animal level.

The CFD simulation results of particle traces by residence time(s) with the 5-mice model near the exhaust revealed that 67 percent of airborne contaminants exit at the exhaust in approximately 23 seconds. This is an effect of thermodynamics: convective heat transfer, buoyant flow and conservation of mass. The particle traces observed illustrated an even air distribution pattern at the animal level, with the air moving sideways and toward the top. The majority of particle contaminants exit at the exhaust, with the remaining (33 percent) trapped near the ceiling. Heavier particle contaminants move sideways and get trapped under the floor. The feeder-trough assembly obstructs and diverts the airflow from the inlet such as it is cleaning the air at the bottom of the cage, making it more comfortable at the animal level.

The CFD simulation results of the entrainment of the ammonia generated at floor level with the 5-mice model near the exhaust reveal that ammonia exhausts the cage at 59 percent through the vent located at the highest end of the cage. This is the result of thermodynamics: convective heat transfer, buoyant flow and conservation of mass. The feeder-trough assembly obstructs and diverts the airflow from the inlet so that the remaining 41 percent of ammonia moves sideways and below the perforated floor, making it more comfortable at the animal level.

Three-dimensional (3D) FLUENT velocity vectors and velocity plots diagrams were developed with the feeder in place (not shown). Both sloped-ceiling and feeder were represented by step-like structures, while the air inlet and exhaust were square-like structures. The 5-mice heat load was located in the back of the cage next to the feeder. Another diagram showed the 5-mice in a half-cage model, inducing a circular airflow pattern without turbulence. There was predominant laminar airflow against the backside of the cage near the exhaust. Also, secondary laminar airflow existed right above the perforated floor, suggesting natural convection airflow. Another diagram illustrated velocity plots induced by the 5-mice in a full-size cage model. There was a bottom flow next to the 5-mice residents in the cage. The air velocity was maximal near the 5-mice and high at air inlet and exhaust. Waste gas ($NH_3$) and particulates (24 microns) behaviors under the same boundary were examined using FLUENT/3D. Probably due to their gravitational settling behaviors, there was a strong tendency for them to move under the perforated floor where they are being trapped. Based on these analyses, one would expect low $NH_3$ concentrations, dry microenvironment, and minimal contaminants, allergens and odor concentrations in the cage right above the floor and out of the cage, thus assuring adequate ventilation, good air quality, and comfortable and healthy microenvironmental conditions.

Also, vector and velocity plot diagrams enabled examination of airflow patterns associated with intracage obstructions and animal heat loads.

Applicant measured heat generation for a five mice huddling equivalent (5-mice) under the same boundary conditions. This permitted applicant to examine the effects of intracage convection air flow quantitatively and qualitatively, including air pressure, velocity and diffusion patterns inside the cage. Furthermore, airflow dynamics associated with microenvironmental factors of ventilation, temperature and humidity were examined. The results of computer modeling indicate that the closed-system design of the invention is highly effective in maintaining stable temperature, low humidity and adequate air exchange. The system employed a filter bank that has been designed to keep the exchange of pathogens and particulates between cage and housing room to a minimum while assuring clean air environment and adequate ventilation.

Tests of systems with no inlet and outlet filters produced an 8.3 cm/s air flow velocity at the inlet centerline. With the assumption of a uniform velocity profile across the inlet this would indicate an inlet flow rate of 161 ccs (inlet area=outlet area=19.3 sq. cm). With the assumption of uniform mixing within the cage and a cage volume of 8250 cc the calculated air exchanges per hour would be 70.14 ACH.

The second technique of the validation study was by hot film anemometry conducted at Colorado State University (CSU), Fort Collins, Colo. The airflow velocity was calibrated by vertical laminar flow tube and regulated by a mass flow controller. With air velocities of less than 10 cm/s, the technique fails to be accurate. However, the estimated air velocities for the closed-top filter-cage are: 8.3 cm/s for 70 ACH (open vent), 6.5 cm/s for 55 ACH (wire cloths), and 1 cm/s for 8.45 ACH (filter membranes).

The laser light sheet visualization of smoke tests were performed under the no inlet/outlet filter conditions only. These smoke flow tests demonstrate that when the simulated mice are: 1) grouped near the inlet, the primary circulation is up from the inlet, along the sloped roof to the outlet, 2) grouped under the outlet, the primary circulation is from the inlet along the ground to the mice and then up to the outlet. An internal secondary circulation cell is created in the portion of the cage not occupied by the primary circulation. The smoke tests indicated that the flow through the cage is somewhat influenced by room air circulation patterns outside the cage. It is optimal to align the cage such that the room air flow is predominantly towards the cage inlet.

Tests with filters on the inlet and/or outlet essentially stopped the primary flow pattern (i.e., inlet to outlet) from forming and created only internal flows within the cage. A fine mesh stainless steel wire-cloth (150×150 mesh size) on the inlet and outlet produced small (less than 1 cm/s, not measurable with hot film techniques) inlet flow velocities. When a wire-cloth of 40×40 mesh size was used on the inlet and outlet, the inlet flow rate was approximately half of the unimpeded flow values.

The third technique of the validation study is the smoke test conducted in a wind tunnel at CSU. Video records of airflow patterns at the inlet, exhaust and inside the cage were obtained by laser light sheet illumination of smoke released from titanium tetrachloride sticks at the inlet. A 6 watt Argon laser, fiber optic cable, and focusing lenses were used to illuminate only a slice of the cage volume, making it easier to observe air distribution patterns.

With the 5-mice model located near the exhaust, the study observed the air rising towards the top and exiting through the vent located at the highest end of the cage. This too, is consistent with thermodynamic principles: convective heat transfer, buoyant flow, and conservation of mass.

Smoke distribution patterns and calculated air velocity rates were visualized from real-time frame analysis. With the 5-mice model located near the inlet, the primary air circulation pattern moves up from the inlet and along the sloped roof to the exhaust, a top flow. With the 5-mice model located under the exhaust, the primary air circulation pattern moves from the inlet along the floor to the 5-mice model and then up to the exhaust, a bottom flow. The estimated air velocities were: 7 cm/s for 59 ACH (open vent), 4.1 cm/s for 35 ACH (wire cloths), and 0.5 cm/s for 4 ACH(filter membranes).

Air leakage was visualized after smoke was released from smoke sticks inside the cage. No leakage was observed from any components, in any configurations. It was observed that the flow through the cage is influenced by room-air circulation patterns outside the cage. It is optimal to align the cage such that the room air flows towards the cage inlet.

It can be concluded that the thermodynamics of natural convection would remove metabolic heat, moisture, and gaseous contaminants and provide good air quality. It can be used in a static closed-system cage for producing adequate contaminants and provide good air quality. It can be used in a static closed-system cage for producing adequate microenvironmental ventilation and efficient in/out biological barriers at cage level.

Although the present invention has been described with reference to preferred embodiments, numerous modifications and variations can be made and still the result will come within the scope of the invention. No limitation with respect to the specific embodiments disclosed herein is intended or should be inferred.

I claim:

1. An isolation container comprising:
   a base which supports a plurality of sides;
   a top affixed to the sides forming a microisolation container suitable to house a heat load;
   one of said sides having an intake port with a filter membrane;
   a second of said sides having an exhaust port with a filter membrane;
   said exhaust port being located higher relative to the base than the intake port on an opposite side, thereby facilitating a convection based air flow from the intake port, across the container, and out the exhaust port.

2. The isolation container of claim 1, wherein the plurality of sides comprises four sides forming a rectangle, the intake and exhaust ports are located at opposite ends on a pair of shorter sides, and the inner surface of said top slopes upward from the intake port side to the exhaust port side.

3. The isolation container of claim 2 wherein said top comprises a water supply vessel terminating in a sipper tube within the container.

4. The isolation container of claim 3 wherein said water supply comprises a water bag constructed from flexible polymeric material.

5. The isolation container of claim 3 wherein said water supply comprises a bottle.

6. The isolation container of claim 2 wherein said base comprises a removable waste tray to facilitate cleaning of the container.

7. The isolation container of claim 2 wherein said base comprises a floor assembly comprising a perforated cage floor insert, an absorbent cage bottom liner under said cage insert, and a waste bag encasing said cage insert and said bottom liner for disposal.

8. The isolation container of claim 2 wherein said exhaust port has an external exhaust nozzle attached thereto.

9. The isolation container of claim 2 which is so configured as to provide laminar convective airflow between said intake port and said exhaust port when said container is occupied by at least one live animal.

10. The isolation container of claim 1 wherein said base and said top can be assembled to form an airtight seal.

11. The isolation container of claim 1 which further comprises a feeder assembly designed to fit inside said container.

12. The isolation container of claim 11 wherein said feeder assembly comprises a V-shaped slotted rack for holding feed and a perforated support supporting same.

13. The isolation container of claim 12 wherein said feeder assembly is adapted to be inserted through an aperture in said top.

14. The isolation container of claim 12 wherein said perforated support is made of non-toxic material.

15. The isolation container of claim 12 wherein said perforated support comprises two perforated tubes.

16. The isolation container of claim 12 wherein said perforated support comprises a single half tube.

17. A system having a plurality of rectangular isolation containers arrayed upon a vertical support rack, comprising:
   a) a rack comprising a base and a vertical support wall which comprises a shelfless cage support, and
   b) a plurality of microisolation containers, each mounted upon at least one side of said vertical support wall by said shelfless support, said isolation containers comprising a base made of transparent material and having an intake port covered with a filter at the front end thereof and a detachable top sealingly attached to said base, said container having an exhaust port covered with a filter and located on the rear end of said container, opposite the front of said base, with the interior of said top forming a domed sloping ceiling for said container, the lower portion thereof being adjacent to the intake end and the upper portion being adjacent to the exhaust end, wherein each of said containers is mounted with its rear end adjacent said vertical support wall.

18. The container-support system of claim 17 wherein each of said containers comprise an external exhaust nozzle attached to said exhaust ports and each of said exhaust nozzles are connected to an exhaust manifold to remove air exhausted from said containers.

19. The container support system of claim 17 wherein said base comprises a floor assembly comprising a perforated cage floor insert, an absorbent cage bottom liner including means to support said cage insert, and a waste bag encasing said cage insert and said bottom liner for disposal.

20. A rectangular microisolation container comprising a base made of transparent material and having an intake port covered with a filter at the front end and a detachable top sealingly attached to said base, said top having an exhaust port covered with a filter and located on the rear end of said top, opposite the front of said base, with the interior of said top forming a domed sloping ceiling for said container, the lower portion thereof being adjacent the air intake end and the upper portion being adjacent the air exhaust end.

* * * * *